United States Patent
Tateno

(10) Patent No.: US 9,922,110 B2
(45) Date of Patent: Mar. 20, 2018

(54) INFORMATION PROCESSING APPARATUS, INFORMATION PROCESSING METHOD, AND PROGRAM

(71) Applicant: SONY CORPORATION, Tokyo (JP)

(72) Inventor: Kei Tateno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 365 days.

(21) Appl. No.: 13/847,078

(22) Filed: Mar. 19, 2013

(65) Prior Publication Data

US 2013/0304732 A1 Nov. 14, 2013

(30) Foreign Application Priority Data

May 11, 2012 (JP) ................................ 2012-109337

(51) Int. Cl.
*G06F 17/30* (2006.01)

(52) U.S. Cl.
CPC .. *G06F 17/30595* (2013.01); *G06F 17/30029* (2013.01); *G06F 17/30761* (2013.01); *G06F 17/30828* (2013.01)

(58) Field of Classification Search
None
See application file for complete search history.

(56) References Cited

U.S. PATENT DOCUMENTS

| | | | |
|---|---|---|---|
| 2009/0178081 A1* | 7/2009 | Goldenberg et al. | 725/46 |
| 2010/0070448 A1* | 3/2010 | Omoigui | 706/47 |
| 2010/0138452 A1* | 6/2010 | Henkin et al. | 707/803 |
| 2010/0161381 A1* | 6/2010 | Song et al. | 705/10 |
| 2010/0169342 A1* | 7/2010 | Kenedy et al. | 707/758 |
| 2011/0295612 A1* | 12/2011 | Donneau-Golencer et al. | 705/1.1 |
| 2012/0023403 A1* | 1/2012 | Herberger | G06F 17/30743 715/716 |
| 2012/0205436 A1* | 8/2012 | Thomas et al. | 235/375 |
| 2012/0259634 A1* | 10/2012 | Tsunokawa | G11B 27/105 704/235 |
| 2013/0041876 A1* | 2/2013 | Dow et al. | 707/706 |

FOREIGN PATENT DOCUMENTS

JP 2012-003359 1/2012

OTHER PUBLICATIONS

Christopher M. Bishop, Pattern Recognition and Machine Learning, Sample Chapter, Springer, 2006.

(Continued)

*Primary Examiner* — Wilson Lee
(74) *Attorney, Agent, or Firm* — Paratus Law Group, PLLC

(57) ABSTRACT

There is provided an information processing apparatus including a link feature amount selecting unit that selects a link feature amount that is a feature amount for linking a first item with another item, an item selecting unit that selects one or more candidates of a second item to be linked with the first item, on the basis of the selected link feature amount, a provision control unit that controls provision, to a user, of the first item, the link feature amount, and the one or more candidates of the second item, and a link creating unit that selects the second item and creates a link of the first item and the second item.

19 Claims, 24 Drawing Sheets

(56) References Cited

OTHER PUBLICATIONS

Al Hasan et al., A Survey of Link Prediction in Social Networks, C.C. Aggarwal (ed.), "Social Network Data Analytics," Chapter 9, Springer Science+Business Media, LLC, 2011.

Zhang et al., Sentiment Analysis for Online Reviews Using an Author-Review-Object Model, M.V.M. Salem et al. (Eds.), AIRS 2011, LNCS 7097, pp. 362-271, Springer-Verlag Berlin Heidelberg 2011.

Su et al., A Survey of Collaborative Filtering Techniques, Hindawi Publishing Corporation, Advances in Artificial Intelligence, vol. 2009, Article ID 421425, 19 pages.

Yang, L., Distance Metric Learning: A Comprehensive Survey, Department of Computer Science and Engineering, Michigan State University, May 19, 2006.

Tibshirani, R., Regression Shrinkage and Selection Via the Lasso, "Journal of the Royal Statistical Society," Series B (Methodological), vol. 58, No. 1, 1996, pp. 267-288.

\* cited by examiner

FIG. 8

| USER ID | CONTENT ID | EVALUATION VALUE | NUMBER OF TIMES OF REPRODUCTION |
|---|---|---|---|
| U1 | C1 | 5 | 23 |
| U1 | C2 | 4 | 15 |
| U1 | C3 | 2 | 3 |
| U1 | C4 | 4 | 11 |
| U1 | C5 | N/A | 0 |
| . . . | | | |
| U2 | C2 | 4 | 10 |
| . . . | | | |

FIG. 9

| CONTENT ID | FEATURE AMOUNT | | |
|---|---|---|---|
| | TEMPO | SOUND DENSITY | RHYTHM MUSICAL INSTRUMENT RATIO |
| C1 | 55 | 39 | 26 |
| C2 | 45 | 60 | 23 |
| C3 | 22 | 30 | 50 |
| C4 | 53 | 69 | 45 |
| . . . | | | |

FIG. 10

| USER ID | FEATURE AMOUNT | | |
| --- | --- | --- | --- |
| | TEMPO | SOUND DENSITY | RHYTHM MUSICAL INSTRUMENT RATIO |
| U1 | 0.42 | -0.03 | 0.06 |
| U2 | 0.12 | 0.65 | -0.14 |
| U3 | -0.21 | 0.11 | 0.54 |
| . . . | | | |

FIG. 13

| EVALUATION OBJECT TUPLE | CONTENT FEATURE AMOUNT ||||||| USER FEATURE AMOUNT ||||| FEEDBACK FEATURE AMOUNT |||||
|---|---|---|---|---|---|---|---|---|---|---|---|---|---|---|---|---|---|
| | GENRE ROCK | GENRE POP | GENRE JAZZ | TEMPO | LOUDNESS | RHYTHM MUSICAL INSTRUMENT RATIO | ... | MAN | WOMAN | 20S OR YOUNGER | 30S | 40S OR OLDER | ... | COOL | ! | ... | FEATURE AMOUNT 4 | FEATURE AMOUNT 5 | ... |
| (C1, U2, F1) | 1 | 0 | 0 | 40 | 55 | 40 | | 1 | 0 | 0 | 1 | 0 | | 1 | 1 | | 0 | 0 | |
| (C1, U4, F6) | 1 | 0 | 0 | 25 | 35 | 15 | | 1 | 0 | 0 | 1 | 0 | | 0 | 0 | | 0 | 0 | |
| (C3, U3, F7) | 0 | 1 | 1 | 20 | 30 | 25 | | 0 | 1 | 1 | 0 | 0 | | 0 | 0 | | 1 | 0 | |
| ... | | | | | | | | | | | | | | | | | | | |

FIG. 14

| USER | CONTENT FEATURE AMOUNT ||||||| USER FEATURE AMOUNT ||||||| FEEDBACK FEATURE AMOUNT |||||
|---|---|---|---|---|---|---|---|---|---|---|---|---|---|---|---|---|---|---|---|
| | GENRE ROCK | GENRE POP | GENRE JAZZ | TEMPO | LOUDNESS | RHYTHM MUSICAL INSTRUMENT RATIO | ... | MAN | WOMAN | 20S OR YOUNGER | 30S | 40S OR OLDER | ... | COOL | ! | ... | FEATURE AMOUNT 4 | FEATURE AMOUNT 5 | ... |
| A1 | 0.85 | 0.20 | -0.42 | 0.021 | 0.152 | 0.002 | | 0.51 | 0.22 | 0.11 | 0.53 | 0.33 | | 0.79 | 0.35 | | 1.24 | 0.80 | |
| A2 | | | | | | | | 0.13 | 0.74 | ... | | | | | | | | | |
| A3 | | | | | | | | 0.53 | 0.55 | ... | | | | | | | | | |
| ... | | | | | | | | | | | | | | | | | | | |

FIG. 17

| CONTENT ID | PREDICTION EVALUATION VALUE $r_{uc}$ |
|---|---|
| C11 | 4.13 |
| C12 | 2.21 |
| C13 | 5.46 |
| C14 | 3.30 |
| ... | |

FIG. 18

| USER ID | USER ACCEPTANCE PROBABILITY $P(v|u)$ |
|---|---|
| U11 | 0.49 |
| U12 | 0.11 |
| U13 | 0.63 |
| U14 | 0.61 |
| ... | ... |

FIG. 19

| CONTENT ID | USER ID | FEEDBACK PREDICTION EVALUATION VALUE $r_{uc}(f, v)$ |
|---|---|---|
| C11 | U11 | 5.24 |
| C12 | U11 | 2.54 |
| C13 | U11 | N/A |
| C14 | U11 | 3.02 |
| . . . | | |
| C11 | U12 | N/A |
| C12 | U12 | 5.73 |
| C13 | U12 | 5.31 |
| C14 | U12 | N/A |
| . . . | | |

FIG. 21

| CONTENT ID | NUMBER OF TIMES OF REPRODUCTION OF EACH USER | |
|---|---|---|
| | U1 | U11 |
| C11 | 23 | 17 |
| C12 | 15 | 21 |
| C13 | 3 | 3 |
| C14 | 11 | 10 |
| C15 | 0 | 41 |
| C16 | 31 | 15 |
| C17 | 17 | 8 |
| . . . | | |

FIG. 22

| CONTENT ID | FEATURE AMOUNT | | |
|---|---|---|---|
| | TEMPO | SOUND DENSITY | RHYTHM MUSICAL INSTRUMENT RATIO |
| C11 | 55 | 39 | 26 |
| C12 | 45 | 60 | 23 |
| C14 | 22 | 30 | 50 |
| C16 | 53 | 69 | 45 |
| C17 | 25 | 47 | 38 |
| . . . | | | |

|     | C11 | C12  | C14  | C16  | C17  |
|-----|-----|------|------|------|------|
| C11 | —   | 23.5 | 41.8 | 35.6 | 33.3 |
| C12 | —   | —    | 46.5 | 25.1 | 28.2 |
| C14 | —   | —    | —    | 50.1 | 21.0 |
| C16 | —   | —    | —    | —    | 36.3 |
| C17 | —   | —    | —    | —    | —    |

1

INFORMATION PROCESSING APPARATUS, INFORMATION PROCESSING METHOD, AND PROGRAM

BACKGROUND

The present disclosure relates to an information processing apparatus, an information processing method, and a program and more particularly, to an information processing apparatus, an information processing method, and a program that are used suitably for creation or provision of links of items.

Recently, with the rapid development of content distribution services such as music or movies, various technologies for searching various items including content have been suggested.

For example, a method of vectorizing feature amounts of items and searching an item similar to an item to be considered, using a Euclid distance between vectors, has been known. In addition, a method of applying item-based collaborative filtering using an evaluation history of a user an searching an item similar to an item to be considered has been known (for example, refer to Japanese Patent Application Laid-Open No. 2012-3359).

SUMMARY

When the search methods described above are used, it is easy to search the item averagely similar to the item to be considered. However, it may be difficult to search related items (for example, items partially similar to the item to be considered) other than the item averagely similar to the item to be considered.

It is desirable to enable links of related items to be easily created or used.

According to an embodiment of the present disclosure, there is provided an information processing apparatus including a link feature amount selecting unit that selects a link feature amount that is a feature amount for linking a first item with another item, an item selecting unit that selects one or more candidates of a second item to be linked with the first item, on the basis of the selected link feature amount, a provision control unit that controls provision, to a user, of the first item, the link feature amount, and the one or more candidates of the second item, and a link creating unit that selects the second item and creates a link of the first item and the second item.

The link feature amount selecting unit may select the link feature amount, on the basis of at least one of the user and the first item.

The link feature amount selecting unit may calculate an important degree of a feature amount of the user, on the basis of an evaluation with respect to an item provided by the user, and may select the link feature amount on the basis of the calculated important degree.

The link feature amount selecting unit may calculate an important degree of a feature amount of the user, on the basis of the link feature amount used in the link of the item that is created by the user, and may select the link feature amount on the basis of the calculated important degree.

The link feature amount selecting unit may select a feature amount notably showing a feature of the first item as the link feature amount.

The link feature amount selecting unit may select a plurality of candidates of the link feature amount. The provision control unit may perform control in a manner that the plurality of candidates of the link feature amount are provided to the user. The item selecting unit may select the one or more candidates of the second item, on the basis of the link feature amount selected by the user.

The provision control unit may perform control a manner that a plurality of candidates of the first item are provided to the user. The item selecting unit may select the one or more candidates of the second item, on the basis of the first item selected by the user and the link feature amount.

The link creating unit may create a link of the first tem and the second item selected by the user.

The provision control unit may control pro to the user, of a further created link of an item to the user.

The provision control unit may perform control in a manner that the link of the item is provided together with created user information.

The provision control unit may perform control in a manner that the link of the item is provided together with information showing the link feature amount used for creation of the link of the item.

When an item use history of the user is provided, the provision control unit may perform control in a manner that an item forming a link with an item included in the item use history is provided to the user.

The information processing apparatus may further include a recommended user selecting unit that calculates, when a plurality of candidate users who are to be candidates recommended for the user are each provided, an expectation value of a change amount of behavior of the user, and selects a recommended user recommended for the user from the candidate users, on the basis of the calculated expectation value. The provision control unit may perform control in a manner that the link of the item that is created by the recommended user is provided to the user together with the recommended user.

The recommended user selecting unit may calculate the expectation value, on the basis of a probability of the user accepting the candidate user and a change amount of a prediction value of an evaluation of the user with respect to a predetermined item group by provision of feedback of the candidate user.

The recommended user selecting unit may calculate the expectation value, on the basis of a probability of the candidate user providing feedback to an item further included in the item group.

The provision control unit may control provision, to another information processing apparatus, of the first item, the link feature amount, and the one or more candidates of the second item.

According to an embodiment of the present disclosure, there is provided an information processing method including causing an information processing apparatus to select a link feature amount that is a feature amount for linking a first item with another item, causing the information processing apparatus to select one or more candidates of a second item that is to be linked with the first item, on the basis of the selected link feature amount, causing the information processing apparatus to control provision, to a user, of the first item, the link feature amount, and the one or more candidates of the second item, and causing the information processing apparatus to select the second item and create a link of the first item and the second item.

According to an embodiment of the present disclosure, there is provided a program for causing a computer to execute the processes, the processes including selecting a link feature amount that is a feature amount for linking a first item with another item, selecting one or more candidates of a second item that is to be linked with the first item, on the basis of the selected link feature amount, controlling provision, to a user, of the first item, the link feature amount, and the candidates of the second item, and selecting the second item and creating a link of the first item and the second item.

According to the embodiment of the present disclosure, the link feature amount to be the feature amount to link the first item with another item is selected, one or more candidates of the second item linked with the first item are selected on the basis of the selected link feature amount, the provision of the first item, the link feature amount, and the candidates of the second item to the user is controlled, and the second item is selected and the link of the first item and the second item is created.

According to the embodiments of the present disclosure described above, links of related items can be easily created. In addition, the created links of the items can be used.

BRIEF DESCRIPTION OF THE DRAWINGS

FIG. 8 is a diagram illustrating a configuration example of data of a user history;

FIG. 9 is a diagram illustrating an example of a feature amount of content;

FIG. 10 is a diagram illustrating an example of a calculation result of a coefficient of regression from a feature amount of content, to an evaluation value of each user with respect to the content;

FIG. 13 is a diagram illustrating an example of a feature amount of a CUF tuple;

FIG. 14 is a diagram illustrating an example of weight with respect to each feature amount used in an acceptance model based on CBF;

FIG. 17 is a diagram illustrating an example of a calculation result of a prediction evaluation value;

FIG. 18 is a diagram illustrating an example of a calculation result of user acceptance probability;

FIG. 19 is a diagram illustrating an example of a calculation result of a feedback prediction evaluation value;

FIG. 21 is a diagram illustrating an example of a history of the number of times of reproduction of content;

FIG. 22 is a diagram illustrating an example of a feature amount of content;

DETAILED DESCRIPTION OF THE EMBODIMENT(S)

Figure 1:
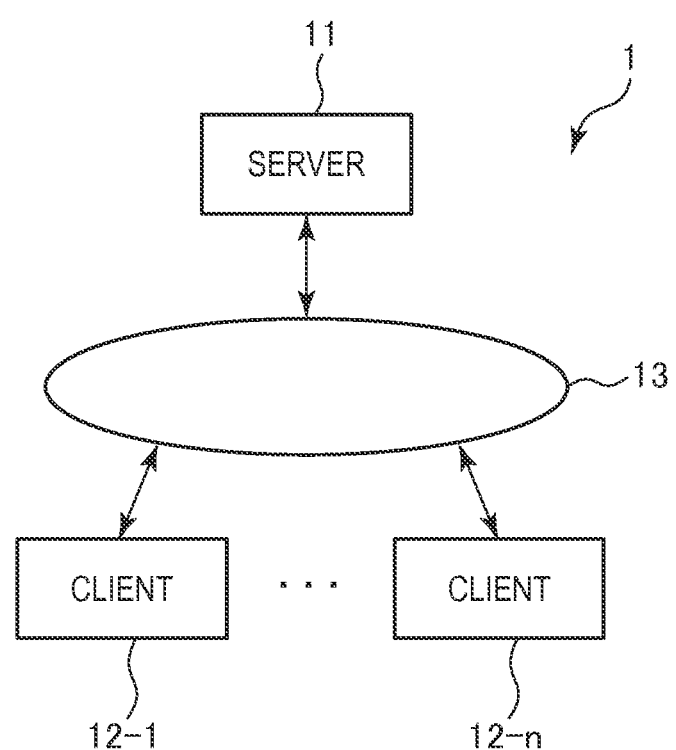
FIG. 1 is a block diagram illustrating an embodiment of an information processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

1. Embodiment
2. Modification

<1. Embodiment>

[Configuration Example of Information Processing System 1]

FIG. 1 is a block diagram illustrating an embodiment of an information processing system to which the present disclosure is applied.

An information processing system 1 includes a server 11 and clients 12-1 to 12-n. The server 11 and the clients 12-1 to 12-n are connected to each other through a network 13.

Hereinafter, when it is not necessary to individually distinguish the clients 12-1 to 12-n, the clients 12-1 to 12-n are simply referred to as the clients 12.

The server 11 provides a distribution or recommendation service of c to be a kind of various items (hereinafter, referred to as a content distribution service) to each client 12.

In the content distribution service, in addition to the content distribution or recommendation service, various services related to the content distribution or recommendation service are provided.

For example, in the content distribution service, a service for supporting giving of feedback such as a comment or an evaluation from users with respect to content or collecting the given feedback and causing the users to share the given feedback is provided.

For example, in the content distribution service, a service for supporting creation of a content link to be a link of related content or causing the users to share the related content is provided.

The content distribution service has a function of a social service and each user can communicate with other users. For example, each user can follow other users or can make a friendship with other users.

In this case, the user following other users is that setting is performed such that a user of a follow origin can automatically acquire information regarding activity (for example, a remark and feedback to various content) on a content distribution service of a user of a follow destination. The making a friendship is that two users make a follow relation with each other.

Hereinafter, the user of the follow origin is referred to as a follower and the user of the follow destination is referred to as a followee. Therefore, the two users who make a friendship are the follower and the followee.

For example, in the content distribution service, a service for recommending other users as well as the content is provided.

Hereinafter, an example of the case in which the server 11 distributes or recommends music to be a kind of content will be described.

The client 12 is configured using an apparatus such as a personal computer, a portable information terminal, a mobile phone, a smart phone, a video player, and an audio player that can use the content distribution service provided by the server 12.

[Configuration Example of Server 11]

Figure 2:
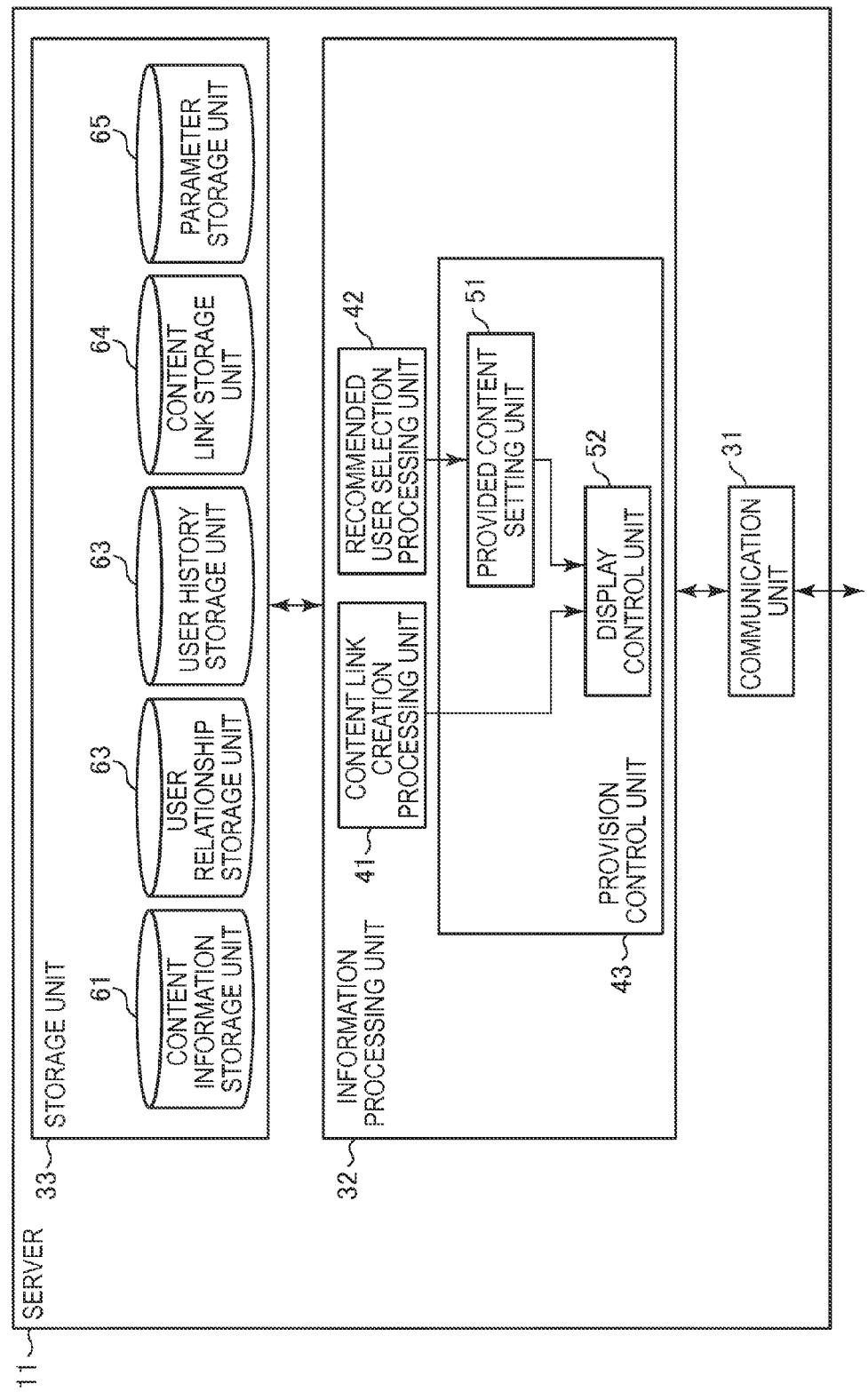
FIG. 2 is a block diagram illustrating a configuration example of a function of a server.

FIG. 2 illustrates a configuration example of a function for executing processing relating to a content link and processing relating to provision of information of other users, among functions of the server 11.

The server 11 includes a communication unit 31, an information processing unit 32, and a storage unit 33.

Individual units of the communication unit 31 and the information processing unit 32 can have access to each other. The individual units of the information processing unit 32 can have access to the individual units of the storage unit 33.

The communication unit 31 performs communication with each client 12 through the network 13 and transmits and receives various information or commands relating to the content distribution service.

The information processing unit 32 executes various processing relating to the content distribution service. The information processing unit 32 includes a content link creation processing unit 41, a recommended user selection processing unit 42, and a provision control unit 43.

The content link creation processing unit 41 executes processing relating to creation of the content link. For example, the content link creation processing unit 41 selects candidates of content of a link source and a link destination of the content link and candidates of a feature amount to link two pieces of content and supplies the selected candidates to the display control unit 52.

Hereinafter, the pieces of content of the link source and the link destination of the content link are referred to as link source content and link destination content, respectively. Hereinafter, a feature amount to link the link source content and the link destination content is referred to as a link feature amount.

For example, the content link creation processing unit 41 determines the link source content, the link destination content, and the link feature amount, on the basis of the command from the user received from the client 12 through the communication unit 31, and creates the content link. The content link creation processing unit 41 stores content link information showing the created content link in a content link storage unit 64 of the storage unit 33.

The recommended user selection processing unit 42 executes processing relating to selection of the recommended user recommended for the user. The recommended user selection processing unit 42 supplies information showing a selection result of the recommended user to a provided content setting unit 51 of the provision control unit 43.

The provision control unit 43 controls provision of various information to each client 12. The provision control unit 43 includes a provided content setting unit 51 and a display control unit 52.

The provided content setting unit 51 sets content of information to be provided to each client 12. The provided content setting unit 51 supplies information showing the set content to the display control unit 52.

The display control unit 52 generates display control data to display various information, transmits the display control data to each client 12 through the communication unit 31, and controls display of various information in each client 12. For example, the display control unit 52 controls the display in each client 12 such as a screen to create a content link or a screen to provide the content link or the recommended users.

The storage unit 33 stores various information used by the content distribution service. The storage unit 33 includes a content information storage unit 61, a user relationship storage unit 62, a user history storage unit 63, a content link storage unit 64, and a parameter storage unit 65.

The content information storage unit 61 stores content information (for example, a feature amount and a parameter) regarding each content provided by the content distribution service.

The user relationship storage unit 62 stores information regarding a relationship between users using the content distribution service, for example, a friendship and a relationship of a followee and a follower.

The user history storage unit 63 stores a user history showing a history of activity of each user in the content distribution service. The user history includes a use history of content of each user or information regarding feedback to the content.

The content link storage unit 64 stores content link information regarding the content link created by each user.

The parameter storage unit 65 stores a parameter of a learning model that is used to select the recommended users recommended for each user.

[Configuration Example of Content Link Creation Processing Unit 41]

Figure 3:
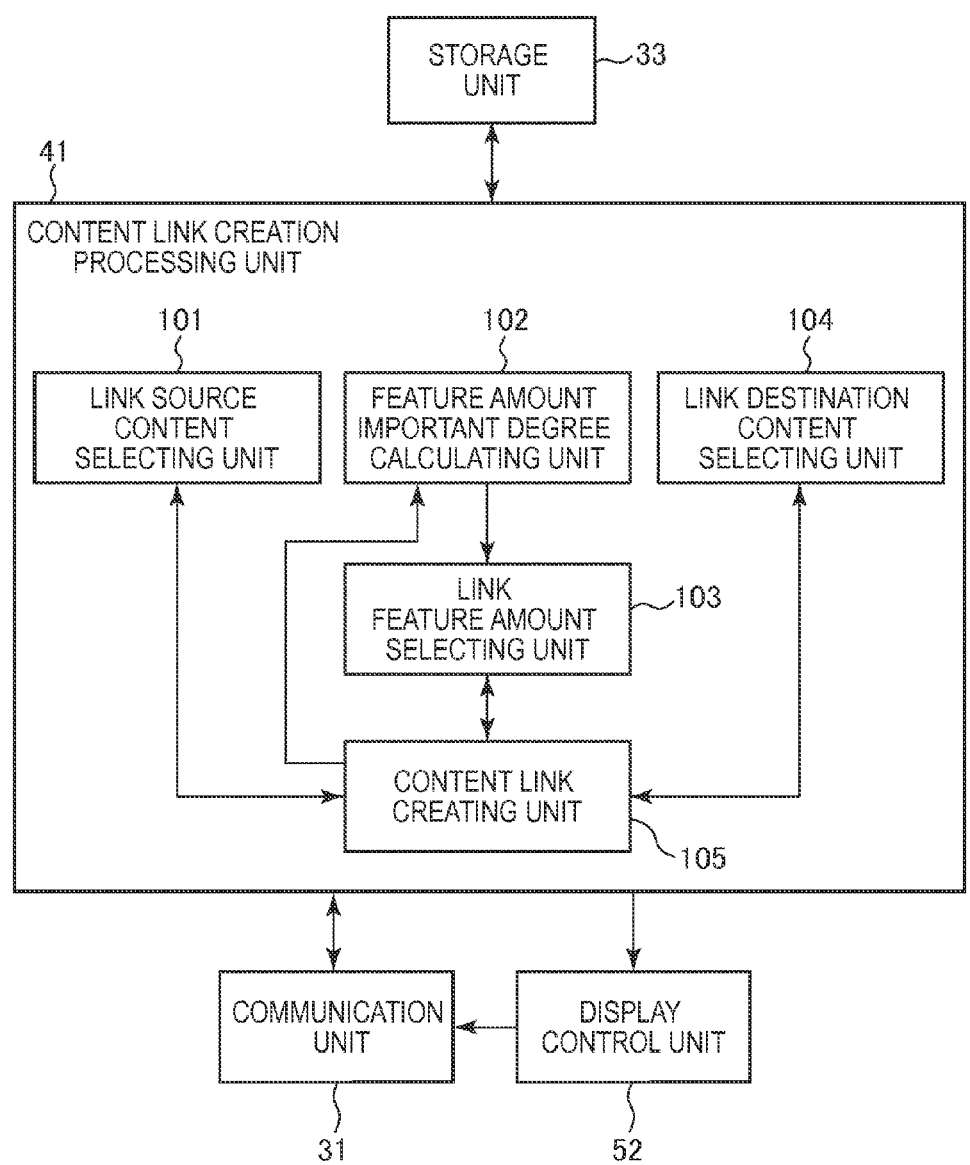
FIG. 3 is a block diagram illustrating a configuration example of a function of a content link creation processing unit.

FIG. 3 illustrates a configuration example of a function of the content link creation processing unit 41 of the server 11. The content link creation processing unit 41 includes a link source content selecting unit 101, a feature amount important degree calculating unit 102, a link feature amount selecting unit 103, a link destination content selecting unit 104, and a content link creating unit 105.

The link source content selecting unit 101 selects one or more candidates of the link source content, on the basis of a user history stored in the user history storage unit 63. The link source content selecting unit 101 supplies information showing the selected candidates of the link source content to the content link creating unit 105 and the display control unit 52.

The feature amount important degree calculating unit 102 calculates important degree of each feature amount of the content, on the basis of the content information stored in the content information storage unit 61 and the user history stored in the user history storage unit 63. The feature amount important degree calculating unit 102 supplies information showing a calculation result of the important degree of each feature amount to the link feature amount selecting unit 103.

The link feature amount selecting unit 103 selects one or more candidates of the link feature amount, on the basis of the important degree calculated by the feature amount important degree calculating unit 102. The link feature amount selecting unit 103 supplies information showing the selected candidates of the link feature amount to the content link creating unit 105 and the display control unit 52.

The link destination content selecting unit 104 selects one or more candidates of the link destination content, on the basis of the link feature amount and the content information stored in the content information storage unit 61. The link destination content selecting unit 104 supplies information showing the selected candidates of the link destination content to the content link creating unit 105 and the display control unit 52.

The content link creating unit 105 determines the link source content, the link feature amount, and the link destination content from the individual candidates, on the basis of a command from the user received from the client 12 through the communication unit 31, and creates the content link. The content link creating unit 105 stores content link information showing the created content link in the content link storage unit 64.

When the link source content or the link feature amount is determined, the content link creating unit 105 supplies information showing the determined link source content or link feature amount to the link source content selecting unit 101, the feature amount important degree calculating unit 102, the link feature amount selecting unit 103, the link destination content selecting unit 104, and the display control unit 52. When the link destination content is determined, the content link creating unit 105 supplies information showing the determined link destination content to the display control unit 52.

[Configuration Example of Recommended User Selection Processing Unit 42]

Figure 4:
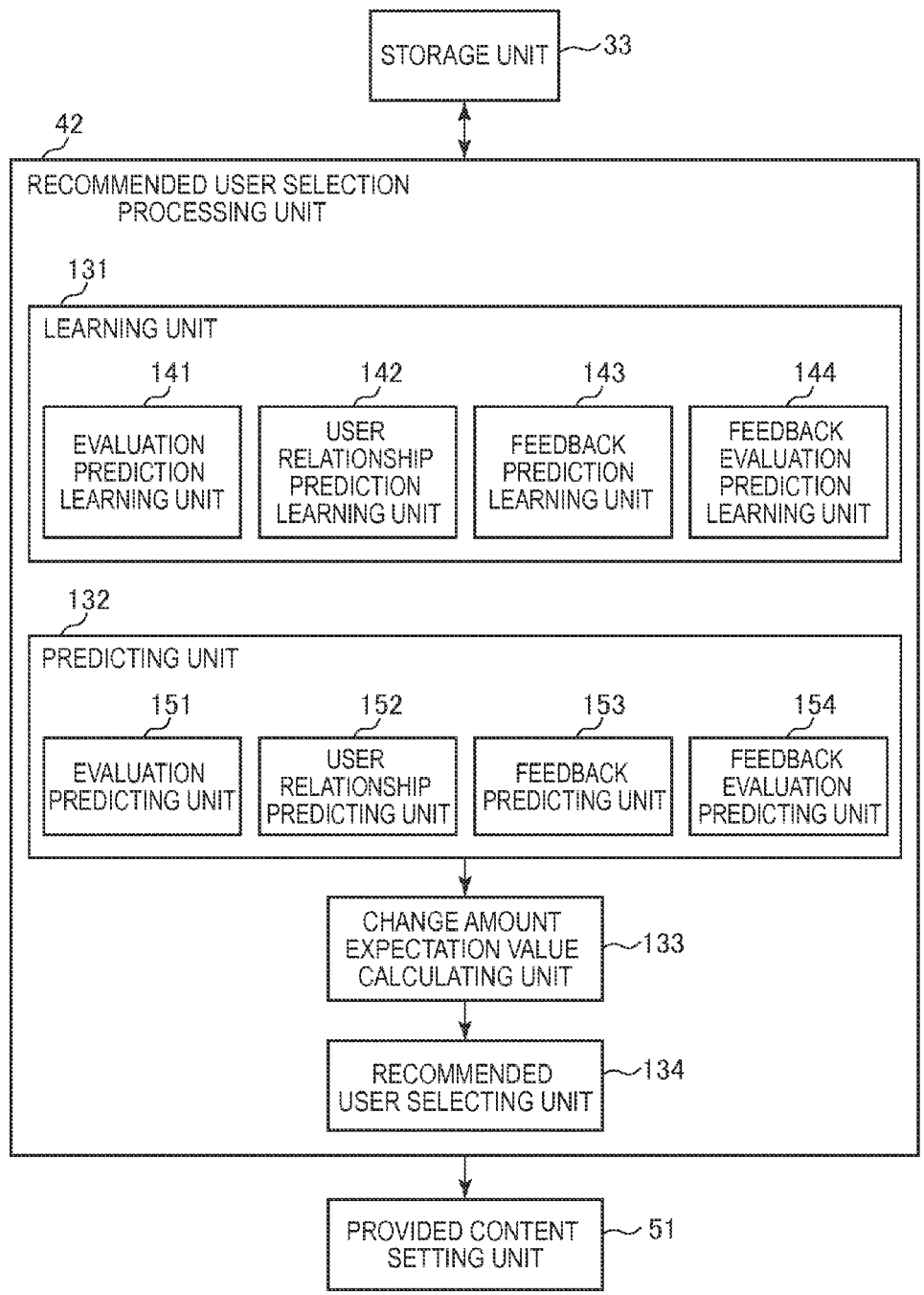
FIG. 4 is a block diagram illustrating a configuration example of a function of a recommended user selection processing unit.

FIG. 4 illustrates a configuration example of a function of the recommended user selection processing unit 42 of the server 11. The recommended user selection processing unit 42 includes a learning unit 131, a predicting unit 132, a change amount expectation value calculating unit 133, and a recommended user selecting unit 134.

The learning unit 131 learns a model for predicting a parameter used for selection of the recommended users recommended for each user. The learning unit 131 includes an evaluation prediction learning unit 141, a user relationship prediction learning unit 142, a feedback prediction learning unit 143, and a feedback evaluation prediction learning unit 144.

The evaluation prediction learning unit 141 generates a model for predicting an evaluation value of each user with respect to the content (hereinafter, referred to as an evaluation prediction model), on the basis of the content information stored in the content information storage unit 61 and the user history stored in the user history storage unit 63. The evaluation prediction learning unit 141 stores a parameter showing the generated evaluation prediction model in the parameter storage unit 65.

The user relationship prediction learning unit 142 generates a model for predicting the probability of each user accepting other users (hereinafter, referred to as a user relationship prediction model), on the basis of the user relationship information stored in the user relationship storage unit 62 and the user history stored in the user history storage unit 63. The user relationship prediction learning unit 142 stores a parameter showing the generated user relationship prediction model in the parameter storage unit 65.

The feedback prediction learning unit 43 generates a model for predicting the probability of each user giving feedback such as a comment or an evaluation to each content (hereinafter, referred to as a feedback prediction model), on the basis of the content information stored in the content information storage unit 61 and the user history stored in the user history storage unit 63. The feedback prediction learning 143 stores a parameter showing the generated feedback prediction model in the parameter storage unit 65.

The feedback evaluation prediction learning unit 144 generates a model for predicting an evaluation value of each user with respect to each content to be provided together with feedback by other users (hereinafter, referred to as a feedback evaluation prediction model), on the basis of the content information stored in the content information storage unit 61 and the user history stored in the user history storage unit 63. That is, the feedback evaluation prediction model is a model for predicting an evaluation value of a user B other than a user A with respect to the content to be provided together with feedback by the user A. The feedback evaluation prediction learning unit 144 stores a parameter showing the generated feedback evaluation prediction model in the parameter storage unit 65.

The predicting unit 132 predicts the parameter used for selection of the recommended users recommended for each user, using the model generated by the learning unit 131. The predicting unit 132 includes an evaluation predicting unit 151, a user relationship predicting unit 152, a feedback predicting unit 153, and a feedback evaluation predicting unit 154.

The evaluation predicting unit 151 predicts an evaluation value of each user with respect to each content, using the evaluation prediction model stored in the parameter storage unit 65. The evaluation predicting unit 151 supplies information showing the predicted result to the change amount expectation value calculating unit 133.

The user relationship predicting unit 152 predicts the probability of each user accepting other users, using the user relationship prediction model stored in the parameter storage unit 65. The user relationship predicting unit 152 supplies information showing the predicted result to the change amount expectation value calculating unit 133.

The feedback predicting unit 153 predicts the probability of each user giving the feedback such as the comment or the evaluation to each content, using the feedback prediction model stored in the parameter storage unit 65. The feedback predicting unit 153 supplies information showing the predicted result to the change amount expectation value calculating unit 133.

The feedback evaluation predicting unit 154 predicts the evaluation value of each user with respect to each content to be provided together with the feedback by other users, using the feedback evaluation prediction model stored in the parameter storage unit 65. The feedback evaluation predicting unit 154 supplies information showing the predicted result to the change amount expectation value calculating unit 133.

The change amount expectation value calculating unit 133 calculates an expectation value of a change amount of the behavior (hereinafter, referred to as a change amount expectation value) before and after recommending other users for each user, on the basis of a prediction result by each unit of the predicting unit 132. In this case, the behavior of the user is a selection on whether or not to use the content or an evaluation with respect to the content. The change amount expectation value calculating unit 133 supplies information showing a calculation result to the recommended user selecting unit 134.

The recommended user selecting unit 134 selects the recommended users recommended for each user, on the basis of the calculation result of the change amount expectation value. The recommended user selecting unit 134 creates recommended user rankings in which the selected recommended users are arranged in order of the recommended users in which change amount expectation values are large. The recommended user selecting unit 134 supplies information showing the created recommended user rankings to the provided content setting unit 51.

[Configuration Example of Provided Content Setting Unit 51]

Figure 5:
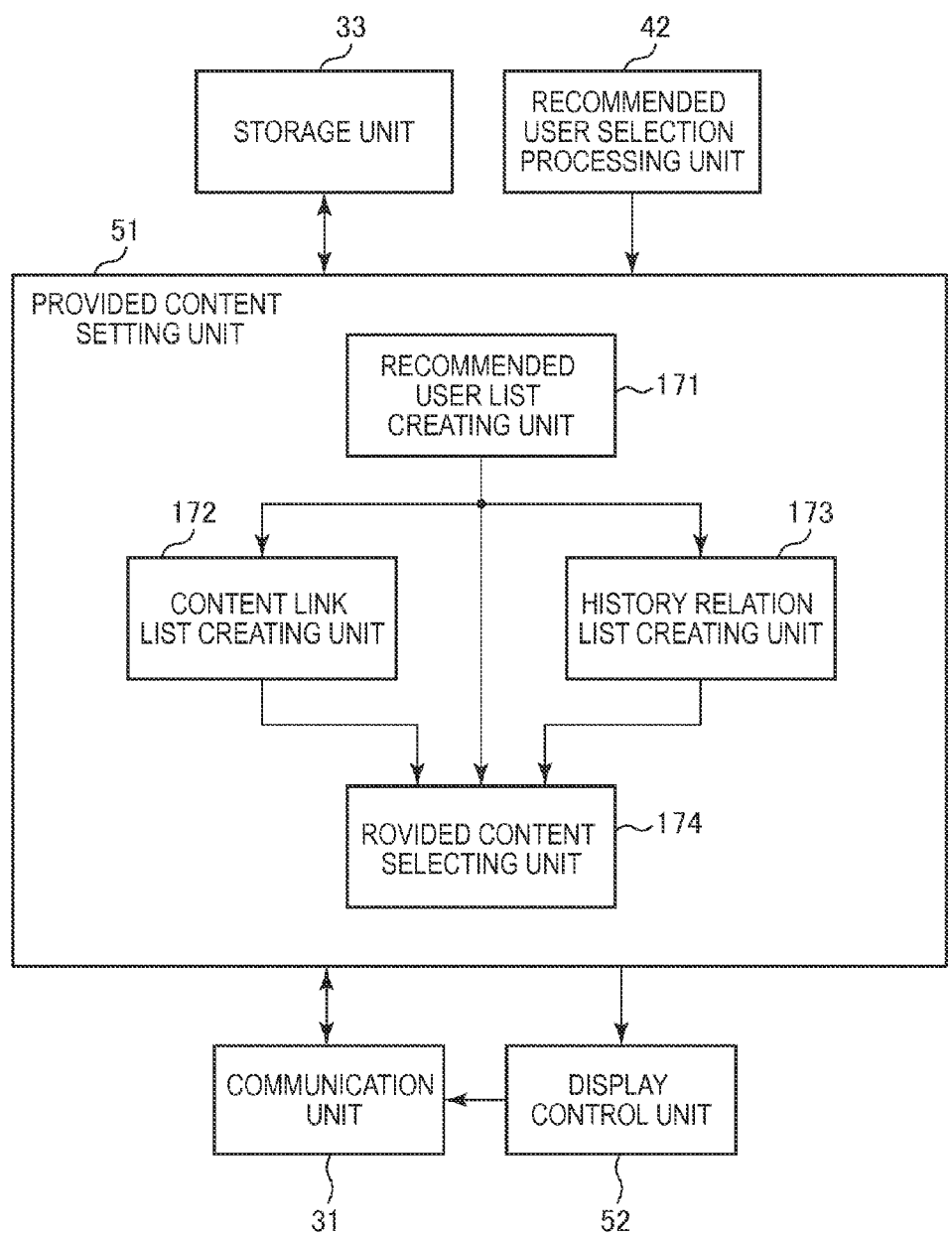
FIG. 5 is a block diagram illustrating a configuration example of a function of a provided content setting unit.

FIG. 5 illustrates a configuration example of a function of the provided content setting unit 51 of the server 11. The provided content setting unit 51 includes a recommended user list creating unit 171, a content link list creating unit 172, a history relation list creating unit 73, and a provided content selecting unit 174.

The recommended user list creating unit 171 creates a recommended user list to be a list of recommended users, on the basis of the recommended user rankings. The detail of the recommended user list will be described below. The recommended user list creating unit 171 supplies the created recommended user list to the content link list creating unit 172, the history relation list creating unit 173, the provided content selecting unit 174, and the display control unit 52.

The content link list creating unit 172 creates a content link list to be a list of content links, on the basis of the content link information stored in the content link storage unit 64. The detail of the content link list will be described below. The content link list creating unit 172 supplies the created content link list to the provided content selecting unit 174 and the display control unit 52.

The history relation list creating unit 173 creates a history relation list in which content links are fused with user histories of content of users, on the basis of the user history stored in the user history storage unit 63 and the content link information stored in the content link storage unit 64. The detail of the history relation list will be described below. The history relation list creating unit 173 supplies the created history relation list to the provided content selecting unit 174 and the display control unit 52.

The provided content selecting unit 174 selects content (hereinafter, referred to as provided content) provided as use histories of content of other users, when information of other users is provided to the user, on the basis of the content information stored in the content information storage unit 61 and the user histories stored in the user history storage unit 63. The provided content selecting unit 174 supplies information showing a selection result of the provided content to the display control unit 52.

[Configuration Example of Client 12]

Figure 6:
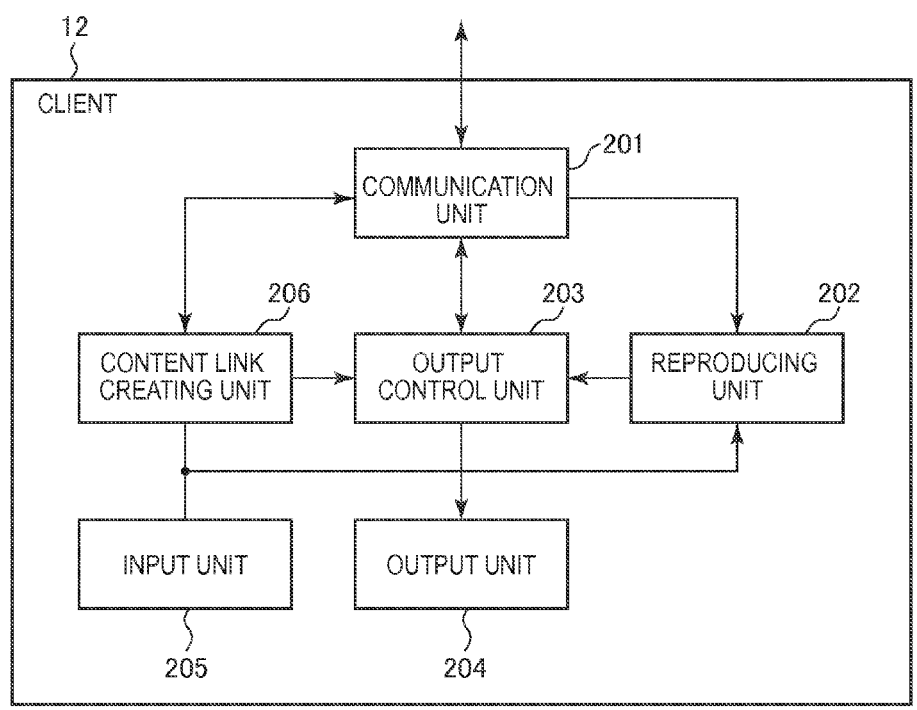
FIG. 6 is a block diagram illustrating a configuration example of a function of a client.

FIG. 6 illustrates a configuration example of a function of the client 12. The client 12 includes a communication unit 201, a reproducing unit 202, an output control unit 203, an output unit 204, an input unit 205, and a content link creating unit 206.

The communication unit 201 performs communication with the server 11 through the network 13 and transmits and receives various information or commands relating to the content distribution service.

The reproducing unit 202 receives content from the server 11 through the network 13 and the communication unit 201 and reproduces the received content. The reproducing unit 202 supplies reproduction data obtained as a reproduction result to the output control unit 203.

The output, control unit 203 receives information provided to the user such as information regarding content and a comment given to the content or information displayed together with reproduction of the content, from the server 11, through the network 13 and the communication unit 201. The output control unit 203 controls display of a moving image or a still image and an output of a sound in the output unit 204, on the basis of the reproduction data. The output control unit 203 controls display of the various information received from the server 11 in the output unit 204.

The output unit 204 is configured using various display devices such as a display and various sound output devices such as a speaker and a sound output terminal.

The input unit 205 is configured using various input devices such as a keyboard, a mouse, a touch panel, and a microphone. The input unit 205 supplies information or a command input by the user to the reproducing unit 202, the output control unit 203, and the content link creating unit 206.

The content link creating unit 206 executes processing relating to creation of the content link while exchanging information or various commands with the server 12, through the network 13 and the communication unit 201.

[Processing of Information Processing System 1]

Next, processing of the information processing system 1 will be described with reference to FIGS. 7 to 27.

(Content Link Creation Processing)

Figure 7:
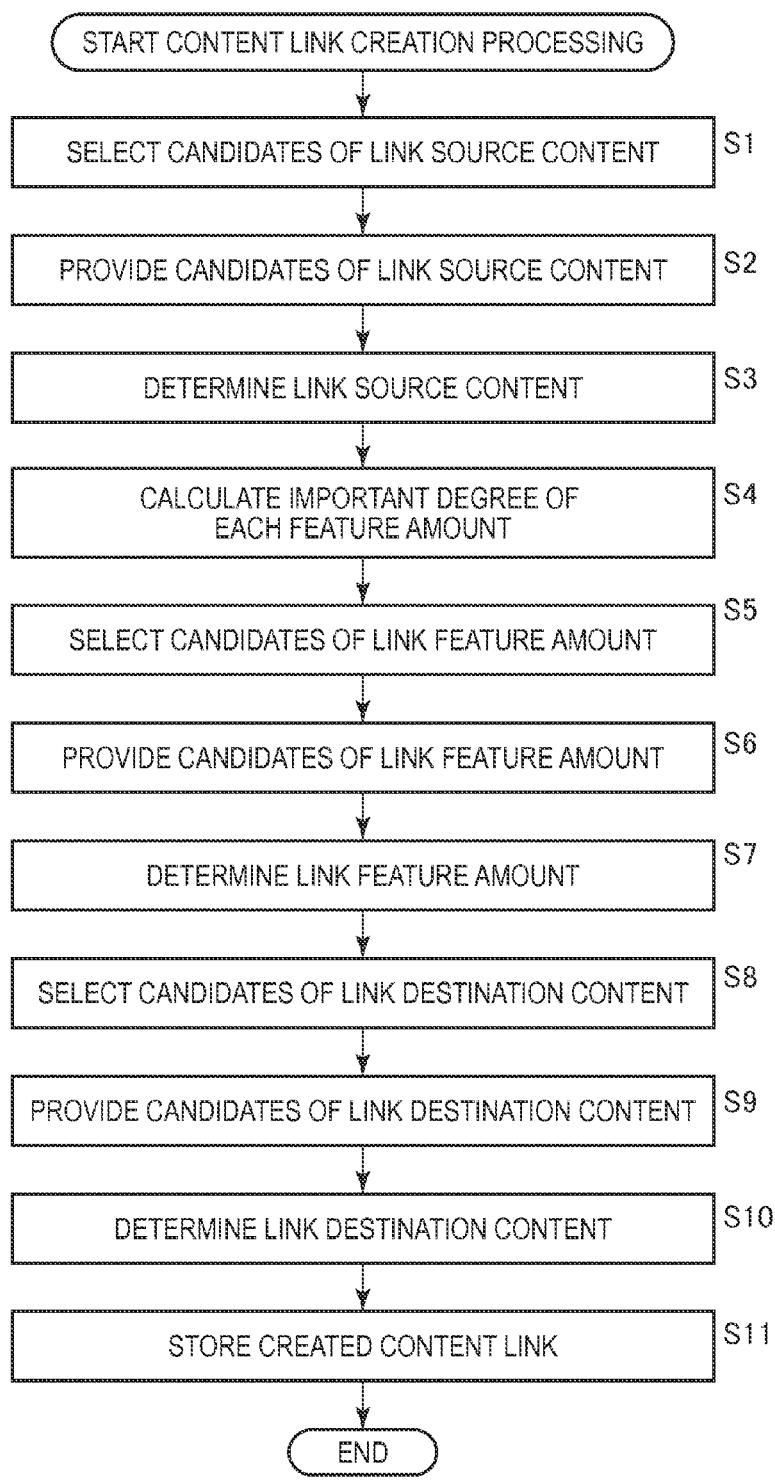
FIG. 7 is a flowchart illustrating content link creation processing.

First, content link creation processing that is executed by the server 11 will be described with reference to a flowchart of FIG. 7.

The content link creation processing starts when a content link creation request is transmitted from one of the clients 12 to the server 11 through the network 13.

Hereinafter, a user who performs creation of the content link in the content link creation processing is referred to as an active user.

In step S1, the link source content selecting unit 101 of the content link creation processing unit 41 selects the candidates of the link source content. For example, the link source content selecting unit 101 selects content suitable for the taste of the active user as the candidate of the link source content, on the basis of the user history stored in the user history storage unit 63. The content that is suitable for the taste of the active user is content in which the use frequency or an evaluation of the active user is high.

In this case, a specific example of a method of selecting the candidate of the link source content will be described with reference to FIG. 8.

FIG. 8 illustrates a configuration example of a part of data of the user history stored in the user history storage unit 63. In this example, the user history includes an evaluation value of each user with respect to each content and the number of times of reproduction of each content.

For example, when a selection condition of the candidate of the link source content is set to selection of content in which the number of times of reproduction is 10 or more, if the active user is a user U1, pieces of content C1, C2, and C4 are selected as the candidates of the link source content.

The link source content selecting unit 101 supplies information showing the selected candidates of the link source content to the content link creating unit 105 and the display control unit 52.

In step S2, the server 11 provides the candidates of the link source content. Specifically, the display control unit 52 generates display control data to display the candidates of the link source content and transmits the display control data to the client 12 of the active user through the communication unit 31.

The output control unit 203 of the client 12 of the active user receives the display control data from the server 11, through the network 13 and the communication unit 201. The output control unit 203 displays the candidates of the link source content by the output unit 204, on the basis of the display control data. Thereby, the candidates of the link source content are provided to the active user.

In step S3, the server 11 determines the link source content.

For example, the active user operates the input unit 205 of the client 12 and selects one desired candidate from the provided candidates of the link source content. At this time, the active user may select the link source content from content other than the provided candidates. The content link creating unit 206 acquires information showing a selection result of the link source content from the input unit 205 and transmits the information to the server 11 through the communication unit 201.

The communication unit 31 of the server 11 receives information showing the selection result of the link source content from the client 12 through the network 13 and supplies the information to the content link creating unit 105. The content link creating unit 105 determines the content selected by the active user as the link source content.

The content link creating unit 105 may select the link source content from the individual candidates, without depending on the selection of the active user.

For example, the content link creating unit 105 may select the content having a highest achievement rate of a candidate selection standard among the individual candidates as the link source content. In the example described above with reference to FIG. 8, when the user U1 is the active user, the content C1 that has the largest number of times of reproduction is selected as the link source content.

Alternatively, the content link creating unit 105 may randomly select the link source content from the individual candidates.

The content link creating unit 105 supplies information showing the determined link source content to the link source content selecting unit 101, the feature amount important degree calculating unit 102, the link feature amount selecting unit 103, the link destination content selecting unit 104, and the display control unit 52.

In step S4, the feature amount important degree calculating unit 102 calculates the important degree of each feature amount, on the basis of at least one of the active user and the link source content.

First, an example of a method of calculating the important degree of each feature amount on the basis of the active user will be described.

For example, the feature amount that is effective in predicting the evaluation value of the active user with respect to the content is a feature amount that affects the evaluation of the active user with respect to the content and has a high important degree for the active user. Therefore, the feature amount important degree calculating unit 102 performs a regressive analysis from the feature amount of the content to the evaluation value of the active user with respect to the content, on the basis of the content information stored in the content information storage unit 61 and the user history stored in the user history storage unit 63. In addition, the feature amount important degree calculating unit 102 sets a calculated regression coefficient to the important degree of each feature amount of the active user. At this time, if L1 regularization is applied to the regressive analysis (for example, Tibshirani, R., "Regression Shrinkage and Selection via the Lasso", Journal of the Royal Statistical Society, Series B, Vol. 58, No. 1, 1996), a regression coefficient of a feature amount that does not contribute to prediction of the evaluation value can be set to 0.

In this case, a specific example of a method of calculating the important degree of the feature amount using the regressive analysis will be described with reference to FIGS. 9 and 10 and FIG. 8 described above.

FIG. 9 illustrates a specific example of a feature amount of content that is included in the content information stored in the content information storage unit 61. In this example, three kinds of feature amounts of a tempo, a sound density, and a rhythm musical instrument ratio are calculated with respect to each content.

FIG. 10 illustrates an example of the regression coefficient that is obtained by performing the regression analysis from the feature amount of the content to the evaluation value of each user with respect to the content, on the basis of the user history of FIG. 8 and the content feature amount of FIG. 9. Because only parts of the user history and the content feature amount are illustrated in FIGS. 8 and 9, data illustrated in FIGS. 8 and 9 does not completely correspond to a calculation result of FIG. 10.

Each regression coefficient illustrated in FIG. 10 is set to the important degree of each feature amount of each user. For example, in the case of this example, for the user U1, the tempo becomes the feature amount having a highest important degree and the sound density becomes the feature amount having a lowest important degree. For the user U2, the sound density becomes the feature amount having a highest important degree and the rhythm musical instrument ratio becomes the feature amount having a lowest important degree. For the user U3, the rhythm musical instrument ratio becomes the feature amount having a highest important degree and the tempo becomes the feature amount having a lowest important degree.

For example, the user may consider the created content link as a standard of the similarity of the user and may learn the important degree of the feature amount on the basis of the created content link.

A method of learning a Mahalanobis distance when a plurality of similarity pairs are given is known (for example, refer to Yang, L., "Distance Metric Learning: A Comprehensive Survey", Michigan State University, 2006)

In the method of learning a Mahalanobis distance, if a covariance matrix is limited to a diagonal matrix, an element of the covariance matrix corresponding to each feature amount can be used as the important degree of each feature amount.

Alternatively, the important degree of each feature amount of the active user may be set on the basis of the history of the link feature amount used by the active user when the content link is created. For example, in the content link created by the active user in the past, the important degree is highly set to the feature amount having the high use frequency in the link feature amount and the important degree is lowly set to the feature amount having the low use frequency in the link feature amount.

Next, an example of a method of calculating the important degree of each feature amount on the basis of the link source content will be described.

For example, the important degree is highly set to the feature amount showing the feature of the link source content notably and the important degree is lowly set to the feature amount not showing the feature of the link source content notably.

In this case, the feature amount showing the feature of the link source content notably is a feature amount which other content rarely has but the link source content has or a feature amount which other content often has but the link source content does not have. For example, when the link source content belongs to a very rare genre, the important degree of genre information to be one of the feature amounts is highly set.

When the feature amount is represented by a continuous amount, the feature amount showing the feature of the link source content notably is a feature amount in which a value of the link source content is greatly different from an entire average. For example, when the tempo of the link source content is fast or slow notably as compared with other content, the important degree of the tempo of the musical composition to be one of the feature amounts is highly set.

The method of calculating the important degree of the feature amount is only exemplary and other methods may be used. The important degree of the feature amount may be calculated on the basis of both the active user and the link source content.

The feature amount important degree calculating unit 102 supplies information showing the calculation result of the important degree of each feature amount to the link feature amount selecting unit 103.

In step S5, the link feature amount selecting unit 103 selects the candidates of the link feature amount. Specifically, the link feature amount selecting unit 103 selects the feature amounts of the predetermined number selected in order of the feature amounts in which the important degrees calculated by the processing of step S4 are high, as the candidates of the link feature amount. The link feature amount selecting unit 103 supplies the information showing the selected candidates of the link feature amount to the content link creating unit 105 and the display control unit 52.

In step S6, in the client 12 of the active user, the candidates of the link feature amount are provided in the same manner as the processing of step S2.

In step S7, the server 11 determines the link feature amount.

For example, the active user operates the input unit 205 of the client 12 and selects one or more desired candidates from the provided candidates of the link feature amount. At this time, the active user may directly input text data and may select the feature amount other than the provided candidates as the link feature amount. The active user may input information to describe the link feature amount. This information may be displayed on a balloon 422a of FIG. 25 to be described below.

The content link creating unit 206 acquires the information showing the selection result of the link feature amount from the input unit 205 and transmits the information to the server 11 through the communication unit 201.

The communication unit 31 of the server 11 receives the information showing the selection result of the link feature amount from the client 12 through the network 13 and supplies the information to the content link creating unit 105. The content link creating unit 105 determines the feature amount selected by the active user as the link feature amount.

The content link creating unit 105 may select the link feature amount from the individual candidates, without depending on the selection of the active user.

For example, the content link creating unit 105 may select one or more feature amounts selected in order of the feature amounts having the high important degrees from the individual candidates, as the link feature amount.

Alternatively, the content link creating unit 105 may randomly select the link feature amount from the individual candidates.

The content link creating unit 105 supplies the information showing the determined link feature amount to the link source content selecting unit 101, the feature amount important degree calculating unit 102, the link feature amount selecting unit 103, the link destination content selecting unit 104, and the display control unit 52.

In step S8, the link destination content selecting unit 104 selects the candidates of the link destination content.

Specifically, the link destination content selecting unit 104 calculates the similarity of the link source content and other content, on the basis of only the determined link feature amount. For example, the link destination content selecting unit 104 calculates the Euclid distance between the link source content and other content, using only the link feature amount, on the basis of the content information stored in the content information storage unit 61. The link destination content selecting unit 104 sets the calculated Euclid distance to the similarity of the link source content and each content. The link destination content selecting unit 104 selects content of the predetermined number selected in order of content having the high similarity with the link source content, as the candidates of the link destination content.

At this time, the candidates of the link destination content may be selected from the content that the active user has used, such that the active user easily selects the candidate. In this case, a selection range of the candidates of the link destination content may be arbitrarily set according to a use level. For example, a set including the content that the active user has reproduced can be set to the selection range or the selection range can be set broadly up to a set including the content that the active user has read information.

The link destination content selecting unit 104 supplies information showing the selected candidates of the link destination content to the content link creating unit 105 and the display control unit 52.

In step S9, in the client 12 of the active user, the candidates of the link destination content are provided in the same manner as the processing of step S2.

In step S10, the server 11 determines the link destination content.

For example, the active user operates the input unit 205 of the client 12 and selects one desired candidate from the provided candidates of the link destination content. At this time, the active user may select the link destination content from the content other than the provided candidates. The content link creating unit 206 acquires information showing the selection result of the link destination content from the input unit 205 and transmits the information to the server 11 through the communication unit 201.

The communication unit 31 of the server 11 receives the information showing the selection result of the link destination content from the client 12 through the network 13 and supplies the information to the content link creating unit 105. The content link creating unit 105 determines the content selected by the active user as the link destination content.

The content link creating unit 105 may select the link destination content from the individual candidates, without depending on the selection of the active user.

For example, the content link creating unit 105 may select the content in which the similarity based on the link feature amount with the link source content is highest, among the individual candidates, as the link destination content.

Alternatively, the content link creating unit 105 may randomly select the link destination content from the individual candidates.

The content link creating unit 105 supplies the information showing the determined link destination content to the display control unit 52.

In step S11, the content link creating unit 105 stores the created content link. Specifically, the content link creating unit 105 associates the link source content and the link destination content forming the created content link, the used link feature amount, and the information (for example, a user ID) regarding the active user who has created the content link and stores the association result in the content link storage unit 64.

Then, the content link creation processing ends.

In this way, because the candidates of the link source content, the link feature amount, and the link destination content are provided according to the taste or the behavior of the active user, a content link in which a satisfaction level is high can be easily created. Because the content similar to the link source content is provided as the candidate of the link destination content on the basis of the selected link feature amount, the active user can find the link destination content related to the link source content, on the basis of various visual points. As a result, a content link that includes a combination of appropriate content can be easily created.

In the above example, the candidates of the link source content, the link feature amount, and the link destination content are provided sequentially and the candidates are determined sequentially. However, the candidates of the link source content, the link feature amount, and the link destination content may be provided at one time and the candidates may be determined at one time.

Figure 11:
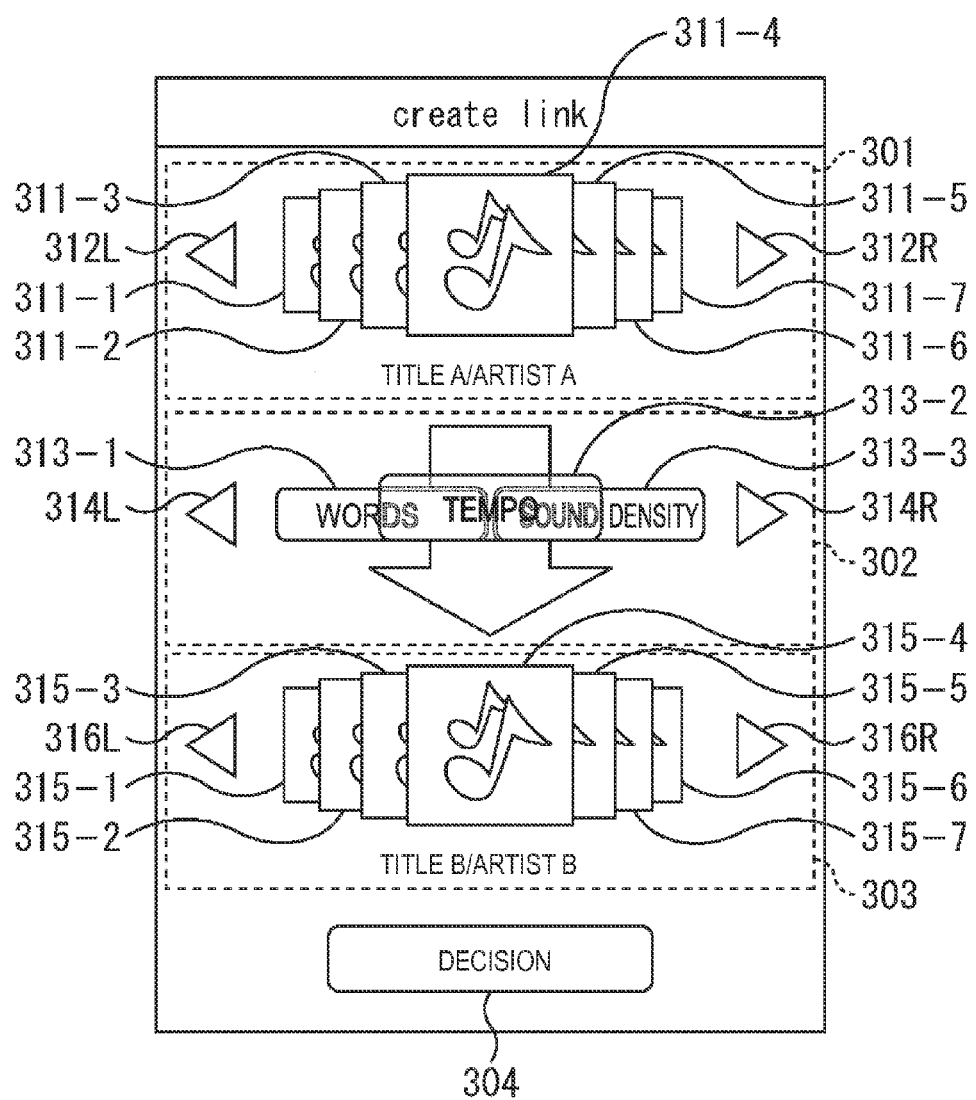
FIG. 11 is a diagram illustrating an example of a content link creation screen.

FIG. 11 illustrates an example of a content link creation screen that is displayed in the client 12, when the candidates of the link source content, the link feature amount, and the link destination content are provided at one time and are determined at one time. A dotted line in FIG. 11 is an auxiliary line to be added for explanation and is not displayed in actuality.

The content link creation screen is divided into a link source content display region 301, a link feature amount display region 302, and a link destination content display region 303. Under the link destination content display region 303, a decision button 304 is arranged.

In the link source content display region 301, icons 311-1 to 311-7 and buttons 312L and 312R are displayed. Each of the icons 311-1 to 311-7 shows each candidate of the link source content and images of an album including corresponding content (musical composition), a single jacket, or an artist are used as the icons.

Hereinafter, when it is not necessary to individually distinguish the icons 311-1 to 311-7, the icons 311-1 to 311-7 are simply referred to as the icons 311.

If the button 312L is pressed, each icon 311 is scrolled in a leftward direction. At this time, when the icon 311 displayed on a left end disappears and there is the candidate of the link source content not displayed in the screen, the icon 311 corresponding to the content appears on a right end. Meanwhile, if the button 312R is pressed, each icon 311 is scrolled in a rightward direction. At this time, when the icon 311 displayed on the right end disappears and there is the candidate of the link source content not displayed in the screen, the icon 311 corresponding to the content appears on the left end. When the icon is displayed on a touch screen, the icon 311 may be scrolled by a flick operation.

The content that corresponds to the icon 311 displayed big at the center becomes content selected as the link source content at that time. Therefore, the icon 311 is scrolled in the leftward or rightward direction and the icon 311 displayed at the center is changed, so that the selection of the link source content can be switched. Under the icon 311 displayed at the center, a title and an artist name of the content corresponding to the icon are displayed.

In the link feature amount display region 302, icons 313-1 to 313-3 and buttons 314L and 314R are displayed. Each of the icons 313-1 to 313-3 shows each candidate of the link feature amount. For example, a character string that shows the link feature amount is displayed.

Hereinafter, when it is not necessary to individually distinguish the icons 313-1 to 313-3, the icons 313-1 to 313-3 are simply referred to as the icons 313.

If the button 314L is pressed, each icon 313 is scrolled in a leftward direction. At this time, when the icon 313 displayed on a left end disappears and there is the candidate of the link feature amount not displayed in the screen, the icon 313 corresponding to the link feature amount appears on a right end. Meanwhile, if the button 314R is pressed, each icon 313 is scrolled in a rightward direction. At this time, when the icon 313 displayed on the right end disappears and there is the candidate of the link feature amount not displayed in the screen, the icon 313 corresponding to the link feature amount appears on the left end. When the icon is displayed on a touch screen, the icon 313 may be scrolled by a flick operation.

The feature amount that corresponds to the icon 313 displayed big at the center becomes a feature amount selected as the link feature amount at that time. Therefore, the icon 313 is scrolled in the leftward or rightward direction and the icon 313 displayed at the center is changed, so that the selection of the link feature amount can be switched.

In the link destination content display region 303, icons 315-1 to 315-7 and buttons 316L and 316R are displayed. Each of the icons 315-1 to 315-7 shows each candidate of the link destination content. For example, images of an album including corresponding content (musical composition), a single jacket, or an artist are used.

Hereinafter, when it is not, necessary to individually distinguish the icons 315-1 to 315-7 the icons 315-1 to 315-7 are simply referred to as the icons 315.

If the button 316L is pressed, each icon 315 is scrolled in a leftward direction. At this time, when the icon 315 displayed on a left end disappears and there is the candidate of the link destination content not displayed in the screen, the icon 315 corresponding to the content appears on a right end. Meanwhile, if the button 316R is pressed, each icon 315 is scrolled in a rightward direction. At this time, when the icon 315 displayed on the right end disappears and there is the candidate of the link destination content not displayed in the screen, the icon 315 corresponding to the content appears on the left end. When the icon is displayed on a touch screen, the icon 315 may be scrolled by a flick operation.

The content that corresponds to the icon 315 displayed big at the center becomes content selected as the link destination content at that time. Therefore, the icon 315 is scrolled in the leftward or rightward direction and the icon 315 displayed at the center is changed, so that the selection of the link destination content can be switched. Under the icon 315 displayed at the center, a title and an artist name of the content corresponding to the icon are displayed.

For example, if the selection of the link source content is switched, the candidate of the link destination content is changed on the basis of the link source content and the link feature amount selected at that time. As a result, the icon 315 of the link destination content display region 303 is updated with an icon showing the candidate of the link destination content after the change.

At this time, when the candidate of the link feature amount is selected on the basis of the link source content, display of the candidate of the link feature amount may be updated according to the change of the link source content. In addition, display of the candidate of the link destination content may be updated according to the change of the link source content and the link feature amount.

Likewise, if the selection of the link feature amount is switched, the candidate of the link destination content is changed on the basis of the link source content and the link feature amount selected at that time. As a result, the icon 315 of the link destination content display region 303 is updated with an icon showing the candidate of the link destination content after the change.

The active user presses the decision button 304 when a desired combination is configured, while individually changing the link source content, the link feature amount, and the link destination content. In this way, a content link that includes a combination of the link source content, the link feature amount, and the link destination content selected at that time is created.

Thereby, the active user can create the content link while confirming the combination of the link source content, the link feature amount, and the link destination content with one screen. The link source content, the link feature amount, and the link destination content can be freely changed, until the decision button is pressed. Therefore, the desired content link can be easily created.

(User Recommendation Learning Processing)

Figure 12:
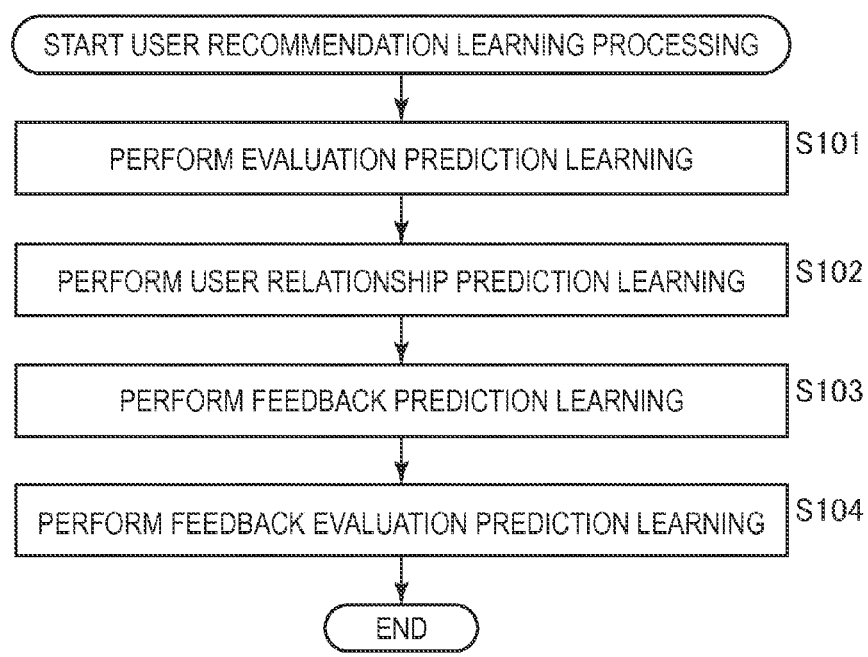
FIG. 12 is a flowchart illustrating user recommendation learning processing.

Next, user recommendation learning processing that is executed by the server 11 will be described with reference to a flowchart of FIG. 12.

The user recommendation learning processing is executed regularly or when a predetermined condition is satisfied. In this case, the predetermined condition is when the user is added or deleted and a command of execution of the user recommendation learning processing is input to the server 11.

In step S101, the evaluation prediction learning unit 141 performs evaluation prediction learning. That is, the evaluation prediction learning unit 141 generates an evaluation prediction model for predicting an evaluation value (for example, likes and dislikes and five steps of evaluations) of each user with respect to the content, using a predetermined learning method, on the basis of the content information stored in the content information storage unit 61 and the user history stored in the user history storage unit 63.

As the learning method that is performed by the evaluation prediction learning unit 141, any method such as a method described in Su, X., Khoshgoftaar, T. M., "A Survey of Collaborative Filtering Techniques", Advances in Artificial Intelligence, vol. 2009, 2009 can be adopted.

The evaluation prediction learning unit 141 stores a parameter showing the generated evaluation prediction model in the parameter storage unit 65.

In step S102, the user relationship prediction learning unit 142 performs the user relationship prediction learning. That is, the user relationship prediction learning unit 142 generates a user relationship prediction model for predicting the probability of each user accepting other users, using the predetermined learning method, on the basis of the user relationship information stored in the user relationship storage unit 62 and the user history stored in the user history storage unit 63.

In this case, the probability of the user A accepting the user B is the probability of the user A making a friendship with the user B or following the user B on the content distribution service. That is, the probability of the user A accepting the user B is the probability of the user A becoming a follower of the user B.

As the learning method that is performed by the user relationship prediction learning unit 142, any method such as a method described in Hasan, M. A., Zaki, M. J., "A Survey of Link Prediction in Social Networks", Social Network Data Analytics, Springer, 2011 can be adopted.

The user relationship prediction learning unit 142 stores a parameter showing the generated user relationship prediction model in the parameter storage unit 65.

In step S103, the feedback prediction learning unit 143 performs feedback prediction learning. That is, the feedback prediction learning unit 143 generates a feedback prediction model for predicting the probability of each user giving feedback such as a comment or an evaluation to each content, using a predetermined learning method, on the basis of the content information stored in the content information storage unit 61 and the user history stored in the user history storage unit 63.

As the learning method that is performed by the feedback prediction learning unit 143, any method such as a method described in Zhang, Y., et al., "Sentiment Analysis for Online Reviews Using an Author-Review-Object Model", Asia Information Retrieval Societies Conference, 2011 can be adopted.

The feedback prediction learning unit 143 stores a parameter showing the generated feedback prediction model in the parameter storage unit 65.

In step S104, the feedback evaluation prediction learning unit 144 performs feedback evaluation prediction learning. That is, the feedback evaluation prediction learning unit 144 generates a feedback evaluation prediction model for predicting an evaluation value of each user with respect to each content to be provided together with feedback by other users, using a predetermined learning method, on the basis of the content information stored in the content information storage unit 61 and the user history stored in the user history storage unit 63.

As the learning method that is performed by the feedback evaluation prediction learning unit 144, any method such as a method described in Japanese Patent Application Laid-Open No. 2011-168975 applied by the same applicant as the present disclosure can be adopted.

In this case, the method described in Japanese Patent Application Laid-Open No. 2011-168975 will be simply described.

For example, when the feedback to the content and the user having given the feedback are provided together with the content, the feedback evaluation prediction learning unit 144 collects data of feedback (hereinafter, referred to as metafeedback) that the provided user has given with respect to a provided combination (hereinafter, referred to as CUF tuple). The feedback evaluation prediction learning unit 144 determines whether the collected metafeedback is positive or negative.

The feedback evaluation prediction learning unit 144 vectorizes the feature amount of the user, the feature amount of the content, and the feature amount of the feedback as one vector, sets the positive determination result or the negative determination result of the metafeedback as a positive example or a negative example, applies a determination method (for example, refer to Bishop C. M., "Pattern Recognition and Machine Learning", Springer-Verlag, 2006) such as a support vector machine and logistic regression, and generates an acceptance model with respect to the CUF tuple.

For example, the feature amount vector of the CUF tuple is expressed as illustrated in FIG. 13. In FIG. 13, values of individual fields show feature amounts of content, a user, and feedback included in an evaluation object tuple illustrated in a first column with respect to individual items illustrated in a second column and the following columns. For example, a first record of FIG. 13 illustrates feature amounts of the content, the user, and the feedback included in a (C1, U2, and F1) tuple to be the evaluation object tuple. Specifically, feature amounts of the content C1 with respect to individual items of "genre rock", "genre pop", "genre jazz", "tempo", "loudness", and "rhythm musical instrument ratio" are 1, 0, 0, 40, 55, and 40, respectively. Feature amounts of the user U2 with respect to individual items of "man", "woman", "20s or younger", "30s", and "40s or older" are 1, 0, 0, 1, and 0. Feature amounts of the feedback F1 with respect to individual items of "cool", "!", "feature amount 4", and "feature amount 5" are 1, 1, 0, and 0, respectively.

The learning is performed on the basis of the determination result of the metafeedback, using the logistic regression, so that the weight for each feature amount to calculate a prediction acceptance degree of each user with respect to the CUF tuple is calculated as illustrated in FIG. 14.

In FIG. 14, values of individual fields show the weights of users illustrated in a first column with respect to individual items illustrated in a second column and the following columns. For example, a first record of FIG. 14 illustrates the weights of the user A1 with respect to the individual items. Specifically, the weights of the user A1 with respect to individual items of "genre lock", "genre pop", "genre jazz", "tempo", "loudness", and "rhythm musical instrument ratio" relating to the content are 0.85, 0.20, −0.42, 0.021, 0.152, and 0.002, respectively. The weights of the user A1 with respect to individual items of "man", "woman", "20s or younger", "30s", and "40s or older" relating to the user are 0.51, 0.22, 0.11, 0.53, and 0.33, respectively. The weights of the user A1 with respect to individual features of "cool", "!", "feature amount 4", and "feature amount 5" relating to the feedback are 0.79, 0.35, 1.24, and 0.80, respectively.

An addition expression using each weight of FIG. 14 becomes an acceptance model. That is, a value that is obtained by multiplying the feature amounts of the content, the user, and the feedback included in the CUF tuple with the corresponding weights of FIG. 14 and adding the feature amounts becomes a prediction acceptance degree of the user with respect to the CUF tuple.

The acceptance model of each user with respect to the CUF tuple can be used as a feedback evaluation prediction model of each user.

When the determination result of the metafeedback is expressed by three values or more, for example, five steps, linear regression may be used, instead of the support vector machine and the logistic regression described above.

The feedback evaluation prediction learning unit 144 stores a parameter showing the generated feedback evaluation prediction model in the parameter storage unit 65.

Then, the user recommendation learning processing ends.
(Content Link Sharing Processing)

Figure 15:
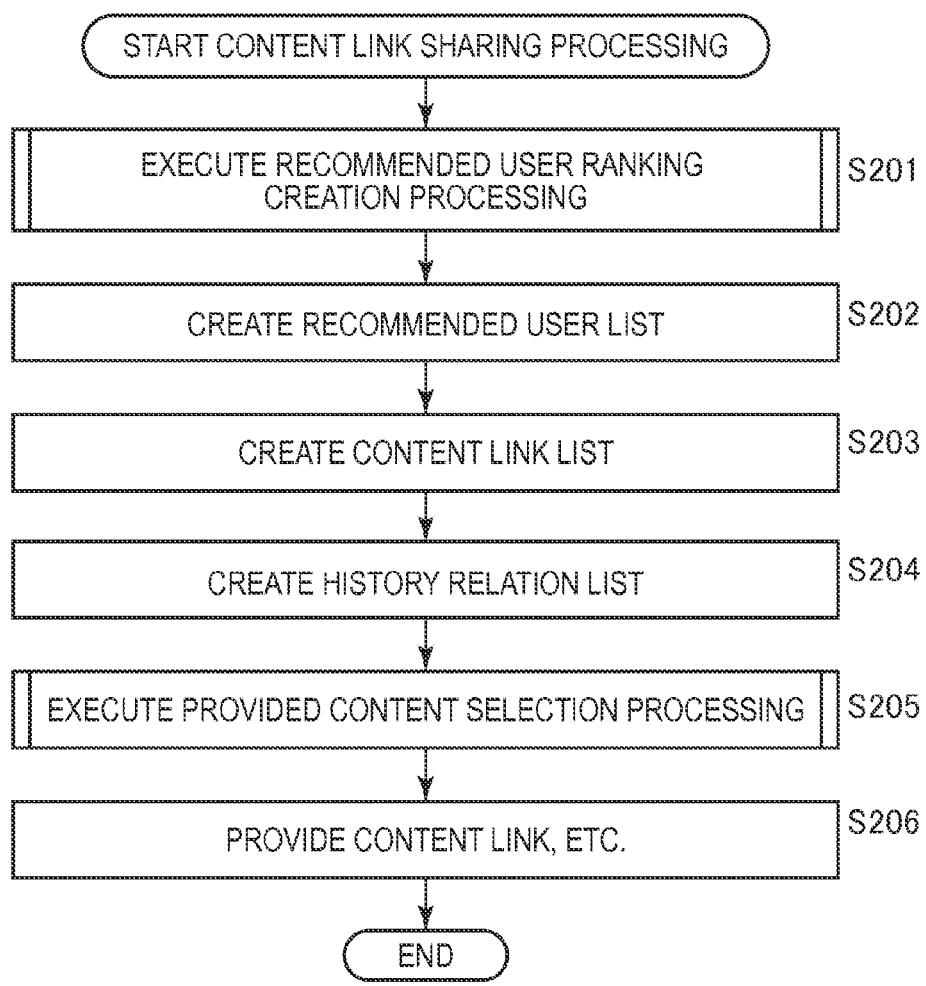
FIG. 15 is a flowchart illustrating content link sharing processing.
Figure 16:
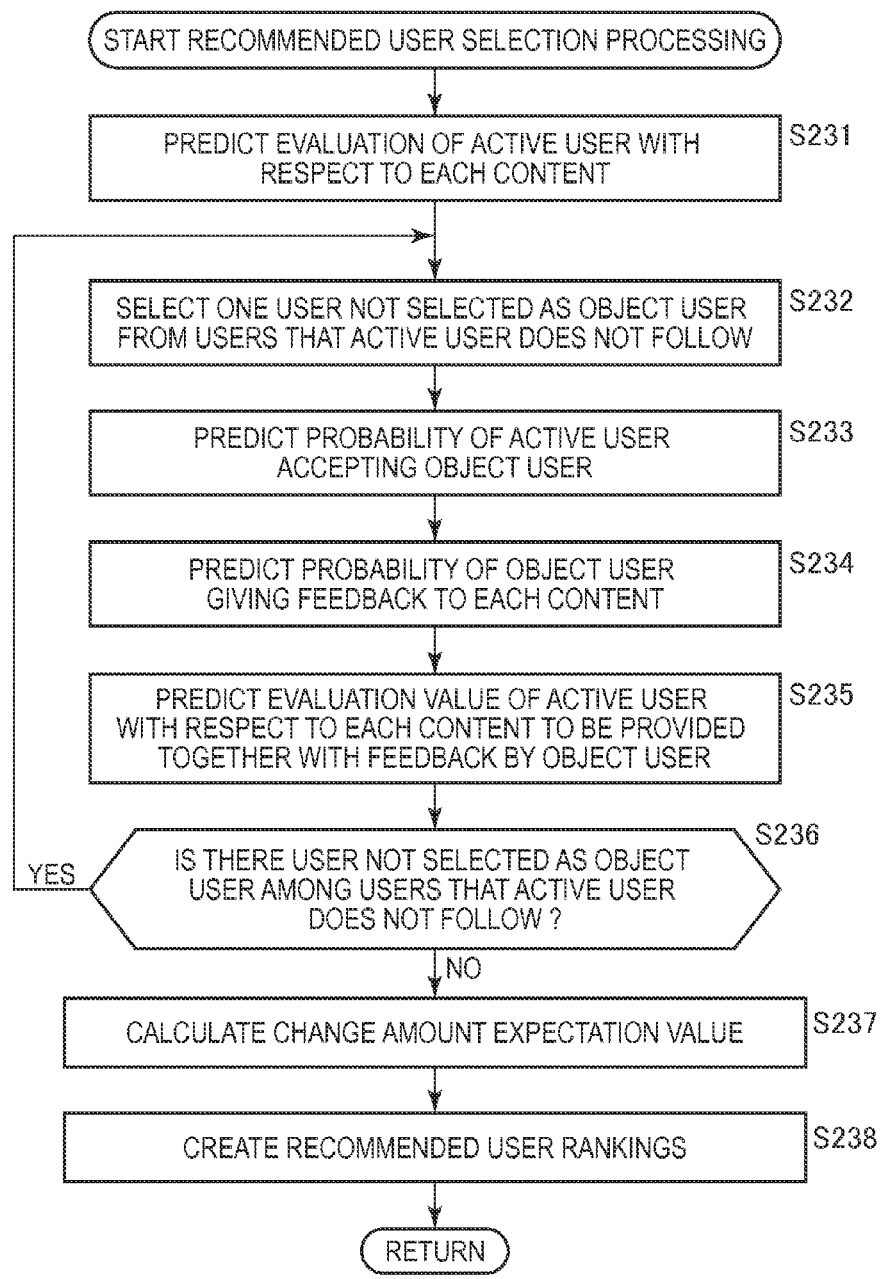
FIG. 16 is a flowchart illustrating the detail of recommended user selection processing.
Figure 20:
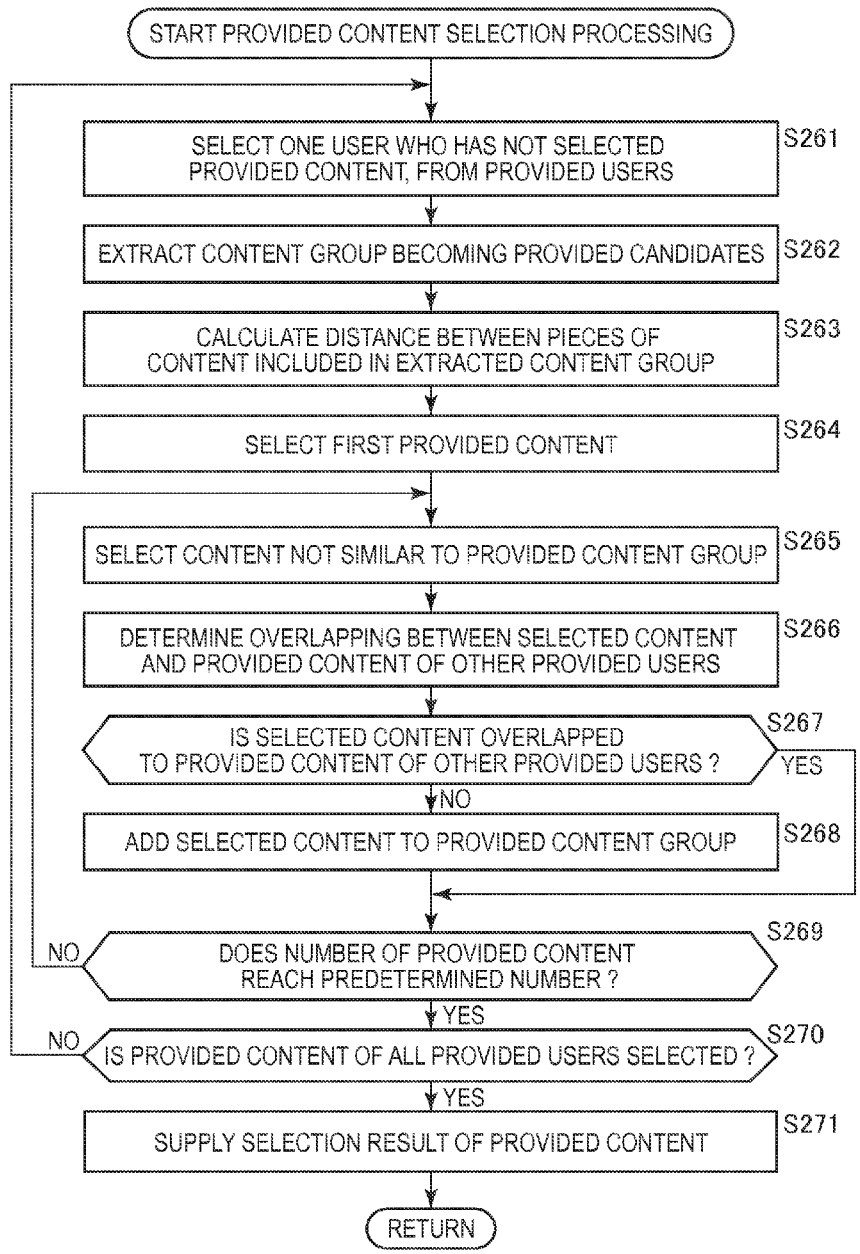
FIG. 20 is a flowchart illustrating the detail of provided content selection processing.

Next, content link sharing processing that is executed by the server 11 will be described with reference to a flowchart of FIG. 15.

The content link sharing processing starts when a display request of a screen including the content link is transmitted from one of the clients 12 to the server 11 through the network 13.

Hereinafter, the user who has requested to display the screen including the content link in the content link sharing processing is referred to as the active user.

In step S201, the server 11 executes recommended user ranking creation processing. In this case, the detail of the recommended user ranking creation processing will be described with reference to a flowchart of FIG. 16.

In step S231, the evaluation predicting unit 151 predicts an evaluation value of the active user with respect to each content. That is, the evaluation predicting unit 151 calculates a prediction evaluation value $r_{uc}$ of an active user u with respect to each content c, using the evaluation prediction model stored in the parameter storage unit 65. The evaluation predicting unit 151 supplies information showing a calculation result to the change amount expectation value calculating unit 133.

In step S232, the predicting unit 132 selects one user not selected as object users from users (hereinafter, referred to as non-follow users) that the active user does not follow. In this case, the object users are users who become objects of the processing of steps S233 to S235.

In step S233, the user relationship predicting unit 152 predicts the probability of the active user accepting the object users. That is, the user relationship predicting unit 152 calculates the user acceptance probability $P(v|u)$ to be the probability of the active user u accepting the object users v, using the user relationship prediction model stored in the parameter storage unit 65. The user relationship predicting unit 152 supplies information showing the calculation result to the change amount expectation value calculating unit 133.

In step S234, the feedback predicting unit 153 predicts the probability of the object user giving the feedback to each content. That is, the feedback predicting unit 153 calculates the feedback giving probability $P(c, f|v)$ to be the probability of the object user v giving the feedback f to each content c, using the feedback prediction model stored in the parameter storage unit 65. The feedback predicting unit 153 supplies information showing the calculation result to the change amount expectation value calculating unit 133.

In step S235, the feedback evaluation predicting unit 154 predicts an evaluation value of the active user with respect to each content to be provided together with the feedback by the object user. That is, the feedback evaluation predicting unit 154 calculates a feedback prediction evaluation value $r_{uc}(f, v)$ of the active user u with respect to each content c to be provided together with the feedback f by the object user v, using the feedback evaluation prediction model stored in the parameter storage unit 65. The feedback evaluation predicting unit 154 supplies information showing the calculation result to the change amount expectation value calculating unit 133.

In step S236, the predicting unit 132 determines whether there is the user not selected as the object user among the users that the active user does not follow. When it is determined that there is the user not selected as the object user among the users that the active user does not follow, the processing returns to step S232.

Then, the processing of steps S232 to S236 is repetitively executed until it is determined in step S236 that there is no user not selected as the object user among the users that the active user does not follow. Thereby, the user acceptance probability $P(v|u)$, the feedback giving probability $P(c, f|v)$ and feedback prediction evaluation value $r_{uc}(f, v)$ are calculated with respect to the non-follow users v of the active user u.

Meanwhile, when it is determined in step S236 that there is no user not selected as the object user among the users that the active user does not follow, the processing proceeds to step S237.

In step S237, the change amount expectation value calculating unit 133 calculates the change amount expectation value.

In general, an expectation value of the change amount of the behavior of the user by giving certain stimulation is calculated by the probability of accepting the stimulation× the change amount of the behavior by the stimulus. The expectation value of the change amount of the behavior of the user can be maximized by giving the stimulus becoming argmax$_{stimulus}$ (the probability of accepting the stimulation× the change amount of the behavior by the stimulus) to the user.

Therefore, the change amount expectation value calculating unit 133 calculates the change amount expectation value E(v|u) of the active user u with respect to each non-follow user v, using the following expressions 1 and 2.

$$E(v \mid u) = P(v \mid u) \sum_c P(c, f \mid v) \Delta(r_{uc}, r_{uc}(f, v)) \quad (1)$$

$$\Delta(r_{uc}, r_{uc}(c, u)) = r_{uc}(c, v) - r_{uc} \quad (2)$$

In the expression 1, P(v|u) shows the probability of the active user u accepting the stimulus (user v) and $\Sigma_c$P(c, f|v)$\Delta$(r$_{uc}$, r$_{uc}$(f,v)) shows the change amount of the behavior of the active user by the stimulus. The change amount expectation value E(v|u) shows a difference of the behaviors of the active user u when the stimulus called the user v (recommendation of the user v) is not given and when the stimulus is given. Therefore, if an absolute value of the change amount expectation value E(v|u) increases, the possibility of the behavior of the active user u changing after the user v is recommended becomes high. Meanwhile, if the absolute value of the change amount expectation value E(v|u) decreases, the possibility of the behavior of the active user u changing after the user v is recommended becomes low.

In addition, $\Delta$(r$_{uc}$, r$_{uc}$(f,v)) shows a change amount of the prediction evaluation value of the active user u with respect to the content c, due to the provision of the feedback of the user v. Therefore, the change amount expectation value E(v|u) shows an expectation value of the change amount of the evaluation value of the active user v with respect to each content, when the stimulus called the user v is given. When the change amount expectation value E(v|u) takes a positive value, if an absolute value thereof increases, the possibility of the evaluation value of the active user with respect to the content entirely increasing after the user v is recommended becomes high. Meanwhile, when the change amount expectation value E(v|u) takes a negative value, if an absolute value thereof increases, the possibility of the evaluation value of the active user with respect to the content entirely decreasing after the user v is recommended becomes high.

The change amount expectation value calculating unit 133 supplies information showing the calculation result to the recommended user selecting unit 134.

In step S238, the recommended user selecting unit 134 creates the recommended user rankings. First, the recommended user selecting unit 134 sets the non-follow users of the active user as the candidate users and selects the is recommended users recommended for the active user from the candidate users. Specifically, the recommended user selecting unit 134 selects the users of the predetermined number selected in order of the users in which the change amount expectation values E(v|u) are the predetermined threshold value or more or the change amount expectation values E(v|u) are large from the non-follow users of the active user, as the recommended users.

Next, the recommended user selecting unit 134 creates the recommended user rankings in which the selected recommended users are arranged in order of the users in which the large change amount expectation values E(v|u) are large. The recommended user selecting unit 134 supplies the information showing the created recommended user rankings to the recommended user list creating unit 171 of the provided content setting unit 51.

Then, the recommended user ranking creation processing ends.

For example, when other users v are recommended for the active user u in a typical social service, it is anticipated that a flow of the following action is generated.

1. The active user u accepts the recommended user v. That is, the active user u follows the user v or makes a friendship with the user v.
2. The user v gives feedback f to certain content c.
3. The active user u views the feedback f by the user v and accepts the content c. For example, the active user u views or reproduces the content c or purchases the content c.

As described above, if the user v in which the change amount expectation value E(v|u) (which is a positive value and of which an absolute value is large) is large is recommended, the possibility of the active user u accepting the user v and the evaluation value of the active user u with respect to each content increasing becomes high. As a result, the possibility of the active user u accepting new content becomes high. Therefore, the high-ranking user in the recommended user rankings is recommended for the active user u, so that new content can be efficiently made to be accepted by the active user u.

The change amount expectation value E(v|u) can be calculated by the following expression 3, instead of the expression 1 described above.

$$E(v \mid u) = P(v \mid u) \sum_{c \in C_v} \Delta(r_{uc}, r_{uc}(f, v)) \quad (3)$$

In the expression 3, $C_v$ shows a set of content which the user v has given the feedback.

In a modification, the change amount expectation value E(v|u) is calculated using only the set of content to which the user v has given the feedback in actuality, without using the feedback giving probability P(c, f|v). Therefore, the feedback prediction learning of step S103 of FIG. 12 and the calculation of the feedback giving probability P(c, f|v) of step S234 of FIG. 16 may be omitted.

In this case, a specific example of the case in which the recommended user is selected using the change amount expectation value E(v|u) of the expression 3 will be described with reference to FIGS. 17 to 19.

FIG. 17 illustrates an example of a calculation result of a prediction evaluation value $r_{uc}$ of the active user u, in this example, the prediction evaluation values $r_{uc}$ of the active user u with respect, to pieces of content C11 to C14 become 4.13, 2.21, 5.46, and 3.30, respectively.

FIG. 18 illustrates an example of a calculation result of the user acceptance probability P(v|u) of the active user u with respect to the user v. In this example, the user acceptance probabilities P(v|u) of the active user u with respect to the users U11 to U14 become 0.49, 0.11, 0.63, and 0.61, respectively.

FIG. 19 illustrates an example of a calculation result of the feedback prediction evaluation value $r_{uc}(f, v)$ of the active user u with respect to the content c to which the feedback of the user v is given. In this example, the feedback prediction evaluation values $r_{uc}(f, v)$ of the active user u with respect to the pieces of content C11, C12, and C14 to which the feedback of the user U11 is given become 5.24, 2.54, and 3.02, respectively. The feedback prediction evaluation values $r_{uc}(f, v)$ of the active user u with respect to the pieces of content C12 and C13 to which the feedback of the user U12 is given become 5.73 and 5.31, respectively.

The feedback prediction evaluation value $r_{uc}(f, v)$ that becomes N/A is not used for calculation of the change amount expectation value E(v|u), because the feedback of the user v is not given to the object content.

For example, the change amount expectation value E(U11|u) of the active user u with respect to the user U11 is calculated as 0.568 (=0.49×(5.24−4.13+2.54−2.21+3.02−3.30) using the expression 3. Meanwhile, the change amount expectation value E(U12|u) of the active user u with respect to the user U12 is calculated as 0.371 (=0.11×(5.73−2.21+5.31−5.46)) using the expression 3.

Therefore, when the user U11 and the user U12 are compared, it is appropriate to recommend the user U11 for the active user u. When one of the users U11 and U12 is selected as the recommended user, the user U11 is selected as the recommended user.

Returning to FIG. 15, in step S202, the recommended user list creating unit 171 creates the recommended user list on the basis of the recommended user rankings. Specifically, the recommended user list, creating unit 171 selects the recommended user recommended for the active user in actuality, from the users included in the recommended user rankings, according to a predetermined standard.

The selection standard of the recommended user can be arbitrarily set. For example, the users from the top of the recommended user rankings to the predetermined rankings can be selected as the recommended users or only the followee of the active user among the users included in the recommended user rankings can be selected as the recommended user.

The recommended user list creating unit 171 creates the recommended user list in which the selected recommended users are arranged according to the predetermined standard. For example, the recommended user list creating unit 171 arranges the recommended users in order of the users in which the change amount expectation values E(v|u) are large and creates the recommended user list. The recommended user list creating unit 171 supplies the created recommended user list to the content link list creating unit 172, the history relation list creating unit 173, the provided content selecting unit 174, and the display control unit 52.

Hereinafter, the users provided to the active user such as the followee of the active user or the users included in the recommended user list, are referred to as provided users.

In step S203, the content link list creating unit 172 creates the content link list. Specifically, the content link list creating unit 172 reads the content links created by the provided users from the content link storage unit 64, arranges the read content links according to the predetermined standard, and creates the content link list.

The standard that is used to arrange the content links may be arbitrarily set. For example, the content links may be arranged in chronological order, for example, in order of new or old creation dates and times. The content links that are created by the provided users having similar feature amounts may be arranged to be adjacent to each other. In contrast, the content links that are created by the provided users having different feature amounts may be arranged to be adjacent to each other.

The content link list creating unit 172 supplies the created content link list to the provided content selecting unit 174 and the display control unit 52.

In step S204, the history relation list creating unit 173 creates the history relation list. For example, the history relation list creating unit 173 extracts the content used by the active user from a past predetermined point of time to a current point of time, on the basis of the user history of the active user stored in the user history storage unit 63.

At this time, an extraction range of the content may be arbitrarily set according to a use level. For example, a set including the content that the active user has reproduced can be set to the extraction range or the extraction range can be set broadly up to a set including the content that the active user has read information.

The history relation list creating unit 173 extracts the content becoming the link source content or the link destination content of the content link created by the provided user among the extracted content and the content link thereof, on the basis of the content link information stored in the content link storage unit 64.

The history relation list creating unit 173 creates the history relation list on the basis of the extracted content and content link. The history relation list creating unit 173 supplies the created history relation list to the provided content selecting unit 174 and the display control unit 52.

The detail of the history relation list will be described below.

In step S205, the provided content selecting unit 174 executes provided content selection processing. In this case, the detail of the provided content selection processing will be described with reference to a flowchart of FIG. 20.

In step S261, the provided content selecting unit 174 selects one user not selecting the provided content from the provided users.

Hereinafter, the user who is selected by step S261 in the above processing is referred to as an object user.

In step S262, the provided content selecting unit 174 selects a content group that becomes the provided candidates. For example, the provided content selecting unit 174 extracts a content group (hereinafter, referred to as provided candidate content group) ranked high in the use history of the content of the object user and included in the use history of the content of the active user, on the basis of the user history stored in the user history storage unit 63.

The content that is ranked high in the use history of the content of the object user is content in which an important degree is high for the object user. For example, the content is determined by the number of times of use of the object user or an evaluation value given by the object user.

The content, that is included in the use history of content of the active user is content that is used by the active user in the past.

The use level of the content that is included in the use history of the object user and the active user may be arbitrarily set. For example, only the content that has reproduced may be included in the use history or the content of which information has been read may be additionally included in the use history.

In this case, an example of the case in which the provided candidate content group is extracted on the basis of the number of times of reproducing the content will be described with reference to FIG. 21. FIG. 21 illustrates a history of the number of times of reproducing the content in each of the active user U1 and the object user U11.

For example, when the extraction condition of the provided candidate content group is set to a condition in which the number of times of reproduction of the object user U11 is 10 or more and the active user has reproduced the content, pieces of content C11, C12, C14, C16, and C17 are extracted.

Hereinafter, the content that is included in the provided candidate content group is referred to as the provided candidate content.

In step S263, the provided content selecting unit 174 calculates the distance between the pieces of content, that is, provided candidate content, included in the extracted content group.

If a distance between content $c_i$ and content $c_j$ is defined as $d(c_i, c_j)$, any method may be adopted as a method of calculating the distance $d(c_i, c_j)$. For example, a Euclid distance in a feature amount space of content or cosine similarity based on an evaluation history of the user can be used for the distance $d(c_i, c_j)$.

In this case, a specific example of a method of calculating a distance between pieces of content will be described with reference to FIGS. 22 and 23. FIG. 22 illustrates an example of the feature amounts of the pieces of content C11, C12, C14, C16, and C17 extracted in the example of FIG. 21 described above. In this example, three kinds of feature amounts of a tempo, a sound density, and a rhythm musical instrument ratio are used. For example, a value of the tempo of the content C11 is 55, a value of the sound density thereof is 39, and a value of the rhythm musical instrument ratio thereof is 26.

Figures 23, 24:
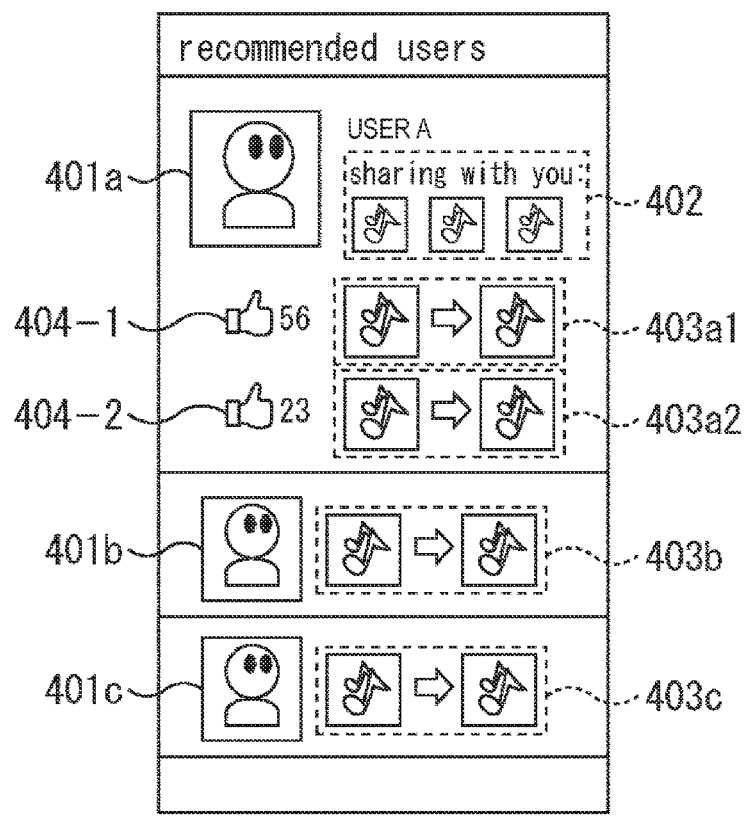
FIG. 23 is a diagram illustrating an example of a calculation result of a Euclid distance between pieces of content.
FIG. 24 is a diagram illustrating a display example of a recommended user list.

FIG. 23 illustrates a calculation result of a Euclid distance between pieces of content, on the basis of the feature amounts of FIG. 22. For example, distances between the content C11 and each of the content C12, the content C14, the content C16, and the content C17 are 23.5, 41.8, 35.6, and 33.3, respectively.

In step S264, the provided content selecting unit 174 selects first provided content. Specifically, the provided content selecting unit 174 selects one piece of content (hereinafter, referred to as first provided content) first provided together with the object user, from the provided candidate content group, using a predetermined method. The provided content selecting unit 174 adds the selected first provided content to the provided content group of the object user.

The provided content group is a set of content selected from the provided candidate content group, in the provided content provided to the active user together with the information of the object user.

As a method of selecting the first provided content, any method can be adopted. For example, the content that is ranked as the top of the use history of the content of the object user may be selected from the provided candidate content group or the content may be randomly selected.

In an example of FIG. 21, when the first provided content of the object user U11 is selected on the basis of the number of times of reproduction, the content C12 in which the number of times of reproduction is largest in the provided candidate content group is selected as the first provided content.

The first provided content is preferably selected from content not selected as the provided content of other provided users.

In step S265, the provided content selecting unit 174 selects content that is not similar to the provided content group. Specifically, the provided content selecting unit 174 selects one piece of content in which a distance with the provided content group is maximized, from the provided candidate content not selected as the provided content.

For example, when the content not selected as the provided content among the provided candidate content is defined as $ca_i$ (i=1, 2, . . . , M) and the content selected as the provided content is defined as $cb_j$ (j=1, 2, . . . , N), the provided content selecting unit 174 selects the content $ca_i$ that satisfies $\mathrm{argmax}_i \Sigma_j d(ca_i, cb_j)$. As a result, the content that is not similar to the selected provided content is selected.

In the case of this example, the content C14 in which the distance from the content C12 selected as the provided content is maximized is selected. When the content C12 and the content C14 are selected as the provided content, the content C16 in which an average of the distances from the content C12 and the content C14 is maximized is selected as the provided content.

At this time, the selected provided content of other provided users may be included in the provided content group used for calculation of the distance. Thereby, the content that is not similar to the provided content of other provided users as well as the provided content of the object user is selected.

In step S266, the provided content selecting unit 174 determines overlapping of the selected content and the (selected) provided content of other provided users.

In step S267, the provided content selecting unit 174 determines whether the selected content overlaps the provided content of other provided users, on the basis of the determination result of step S266. When it is determined that the selected content does not overlap the provided content of other provided users, the processing proceeds to step S268.

In step S268, the provided content selecting unit 174 adds the selected content to the provided content group of the object user.

Then, the processing proceeds to step S269.

Meanwhile, when it is determined in step S267 that the selected content overlaps the provided content of other provided users, the processing of step S268 is skipped and the processing proceeds to step S269. That is, the selected content is not added to the provided content group of the object user. The selected content is excluded from the provided candidate content group of the object user.

In step S269, the provided content selecting unit 174 determines whether the number of provided content of the object user reaches the predetermined number. When it is determined that the number of provided content of the object user does not reach the predetermined number, the processing returns to step S265.

Then, the processing of steps S265 to S269 is repetitively executed until when it is determined in step S269 that the number of provided content reaches the predetermined number. Thereby, from the content ranked as the top in the use history of the object user and included in the use history of the active user, the content not matched with the provided content of other provided users is selected as the provided content of the object user by the predetermined number. Preferably, the selected provided content is not similar to each other. Therefore, the kinds of provided content that is provided for one provided user become various.

Meanwhile, when it is determined in step S269 that the number of provided content reaches the predetermined number, the processing proceeds to step S270.

In step S270, the provided content selecting unit 174 determines whether the provided content of all of the provided users is selected. When it is determined that the provided content of all of the provided users is not selected, the processing returns to step S261.

Then, the processing of steps S261 to S270 is repetitively executed until it is determined in step S270 that the provided content of all of the provided users is selected. Thereby, the provided content of all of the provided users is selected by the predetermined number.

Meanwhile, when it is determined in step S270 that the provided content of all of the provided users is selected, the processing proceeds to step S271.

In step S271, the provided content selecting unit 174 supplies information showing the selection result of the provided content of each provided user to the display control unit 52.

Then, the provided content selection processing ends.

Returning to FIG. 15, in step S206, the server 11 provides the content link, etc. Specifically, the display control unit 52 generates display control data to display a screen including at least one of the recommended user list, the content link list, and the history relation list. A combination and display of the recommended user list, the content link list, and the history relation list are changed according to a request from the client 12. The display control unit 52 transmits the generated display control data to the client 12 of the active user through the communication unit 31.

The output control unit 203 of the client 12 of the active user receives the display control data from the server 11, through the network 13 and the communication unit 201. The output control unit 203 displays the screen including at least one of the recommended user list, the content link list, and the history relation list by the output unit 201, on the basis of the display control data.

In this case, a specific example of the recommended user list, the content link list, and the history relation list displayed in the client 12 will be described with reference to FIGS. 21 to 27.

FIG. 24 illustrates a display example of the recommended user list. In FIG. 24, a dotted line is an auxiliary line to be added for explanation and is not displayed in actuality.

In this example, users A to C are provided as the recommended users in a vertically arranged state.

User images 401a to 401c are images that show the users A to C, respectively. For example, a photo or an avatar of each user is used. A name or a nickname of the user A is displayed on the right side of the user image 401a.

On the right side of the user image 401a and under the name of the user A, a provided content display region 402 is provided. In the provided content display region 402, images that show provided content of the user A are displayed in a horizontally arranged state. In the images that show the content, photos of an album including each content, a single jacket, or an artist are used. This is applicable to images showing other content in FIGS. 24 to 27.

Under the provided content display region 402, a content link display region 403a1 is provided. In the content link display region 403a1, a content link created by the user A is displayed. Specifically, an image showing link source content is displayed on the left side of a rightward arrow and an image showing link destination content is displayed on the right side of the arrow.

On the left side of the content link display region 403a1, a feedback button 404-1 is displayed. The feedback button 404-1 is a button that is pressed to give feedback to express likeness of the content link, when the active user likes the content link in the content link display region 403a1. On the right side of the feedback button 404-1, the number (hereinafter, referred to as the number of feedback users) of users having given the feedback to the content link in the content link display region 403a1 is displayed.

Under the content link display region 403a1, a content link display region 403a2 to display a content link to be different from the content link in the content link display region 403a1 and be created by the user A is provided.

On the left side of the content display region 403a2, the same feedback button 404-2 as the feedback button 404-1 is displayed. On the left side of the feedback button 404-2, the number of feedback users with respect to the content link in the content link display region 403a2 is displayed.

On the right side of the user image 401b, a content link display region 403b is provided. In the content link display region 403b, a content link that is created by the user B is displayed.

On the right side of the user image 401c, a content link display region 403c is provided. In the content link display region 403c, a content link that is created by a user C is displayed.

The display order of the recommended users may be arbitrarily set. For example, the recommended users may be arranged in order of the users in which the change amount expectation values E(v|u) are large. The users who have the similar feature amounts may be arranged to be adjacent to each other. In contrast, the users who do not have the similar feature amounts may be arranged to be adjacent to each other.

Figure 25:
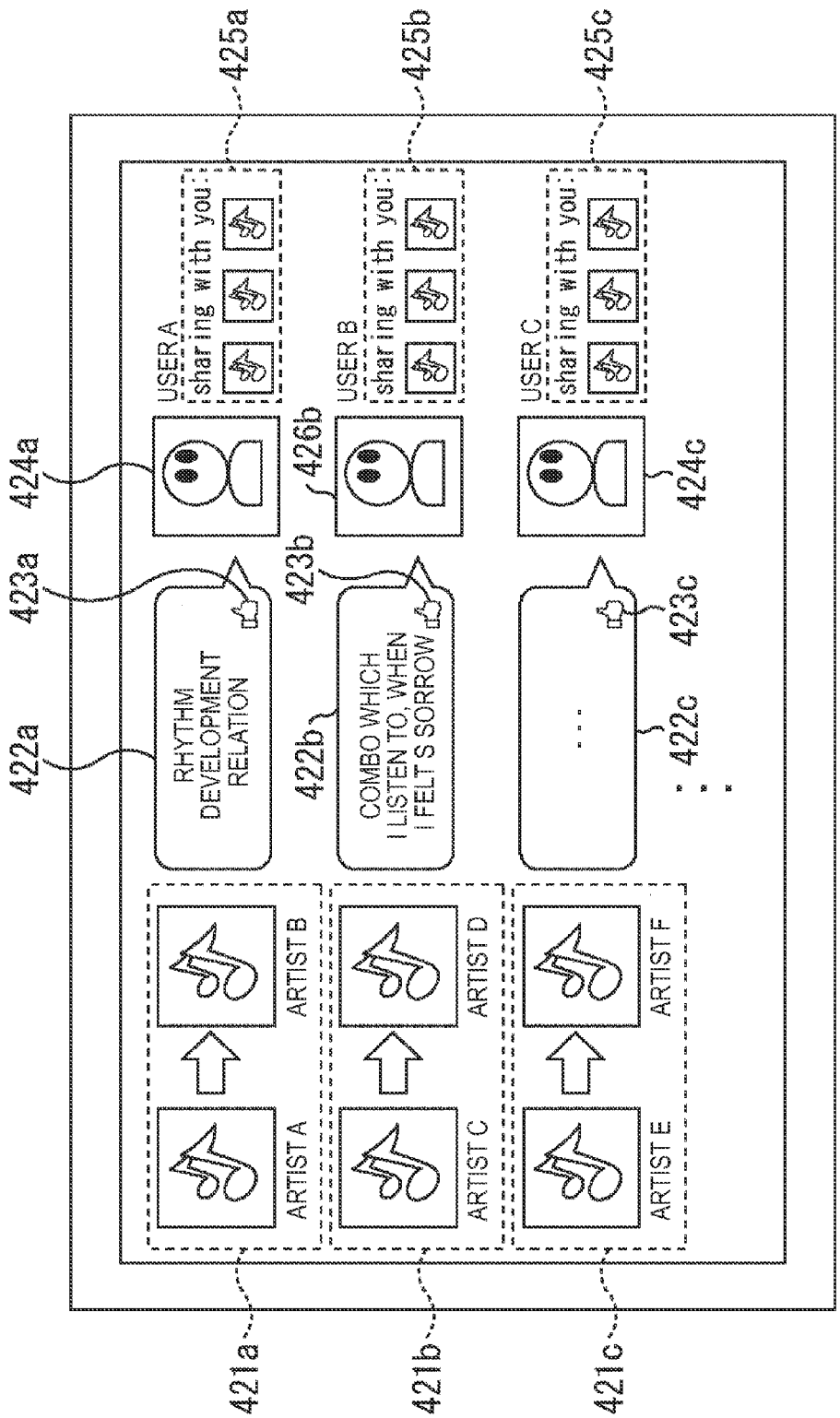
FIG. 25 is a diagram illustrating a display example of a content link list.

FIG. 25 illustrates a display example of the content link list. In FIG. 25, a dotted line is an auxiliary line to be added for explanation and is not displayed in actuality.

In this example, content links created by the users A to C to be the followees of the active user and information regarding the users A to C are arranged in three steps in a vertical direction and are displayed.

On the left side of a first step, a content link display region 421a is provided. Display content in the content link display region 421a is the same as the display content in the content link display regions 403a1 to 403c of FIG. 24, except that an artist name of each content is displayed under an image showing each content.

On the right side of the content link display region 421a, a balloon 422a is displayed. In the balloon 422a, information showing a link feature amount used in the content link in the content link display region 421a, that is, information showing a relation of two pieces of content forming the content link is displayed. In the information, a label of the link feature amount that is provided from the server 11 may be used and information that is created by the user who has created the content link may be used. In the balloon 422a, a feedback button 423a with respect to the content link in the content link display region 421a is displayed.

On the right side of the balloon 422a, a user image 424a that shows the user who has created the content link in the content link display region 421a is displayed. On the right side of the user image 424a, a name or a nickname of the user A is displayed.

On the right side of the user image 424a and under the name of the user A, the same provided content display region 425a as the provided content display region 402 of FIG. 24 is provided. In the provided content display region 425a, an image that shows the provided content of the user A is displayed.

In a second step, a content link created by the user B and information regarding the user B are displayed by the same configuration as the first step. In a third step, a content link created by the user C and information regarding the user C are displayed by the same configuration as the first and second steps.

The display order of the content links may be arbitrarily set. For example, the content links may be arranged in chronological order, for example, in order of new or old creation dates and times. The content links that are created by the users having similar feature amounts may be arranged to be adjacent to each other. In contrast, the content links that are created by the users having different feature amounts may be arranged to be adjacent to each other.

Figure 26:
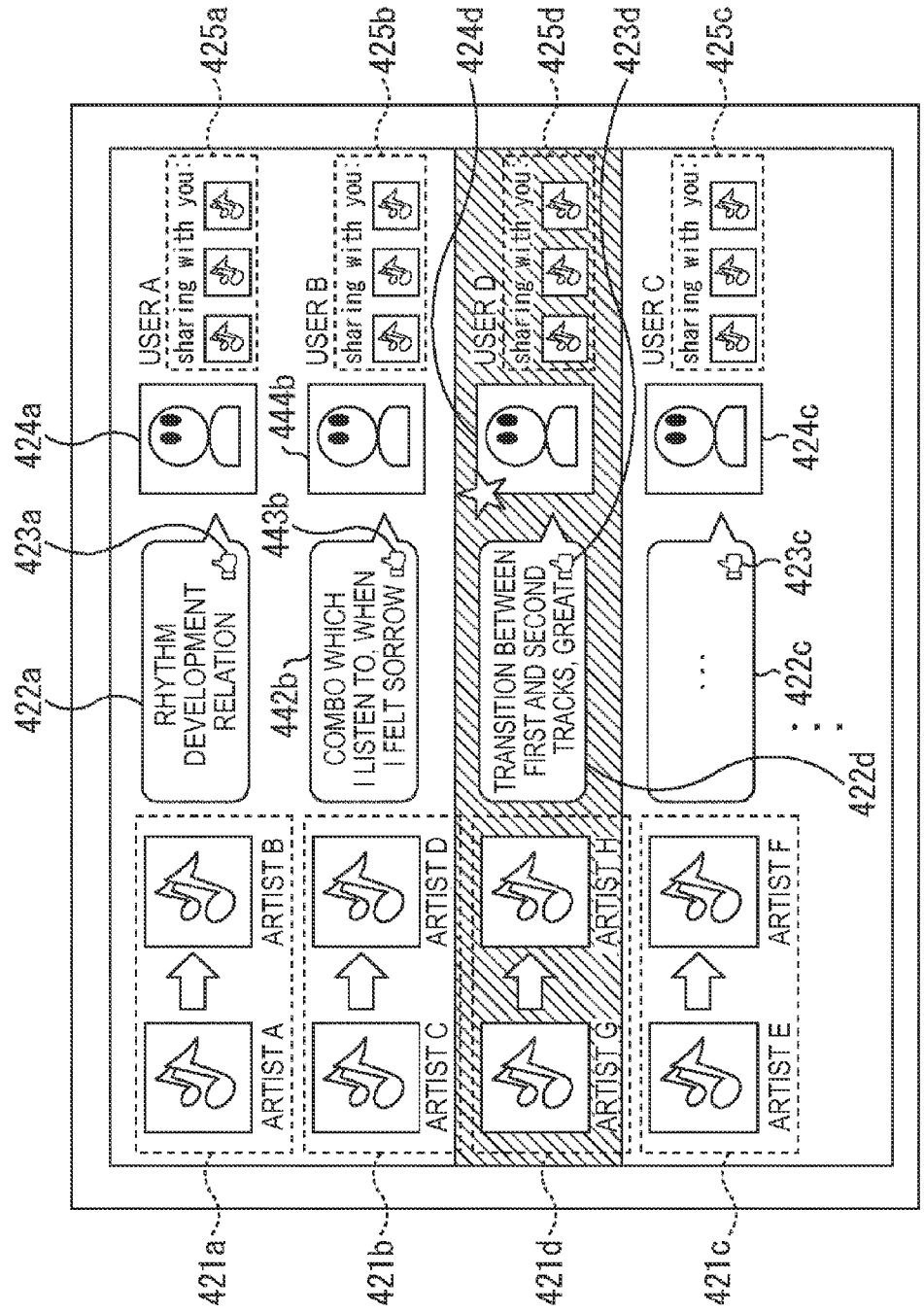
FIG. 26 is a diagram illustrating another display example of a content link list.

As illustrated in FIG. 26, the content links of the recommended users as well as the followee of the active user may be mixed and displayed.

Specifically, in the content link list of FIG. 26, a step shown by an oblique line is inserted between the content links of the second and third steps of the content links of FIG. 25. In this step, a content link of a user D to be the recommended user and information regarding the user D are displayed by the same configuration as the other steps. On the upper left side of an image 424d that shows the user D, an asterisk showing that the user D is the recommended user is displayed.

As illustrated in FIG. 26, the content link of the recommended user may be distinguished from the content link of the followee or may not be distinguished from the content link of the followee. For example, the content link of the recommended user may be displayed to be adjacent to the content link of the followee having the most similar feature amount.

Figure 27:
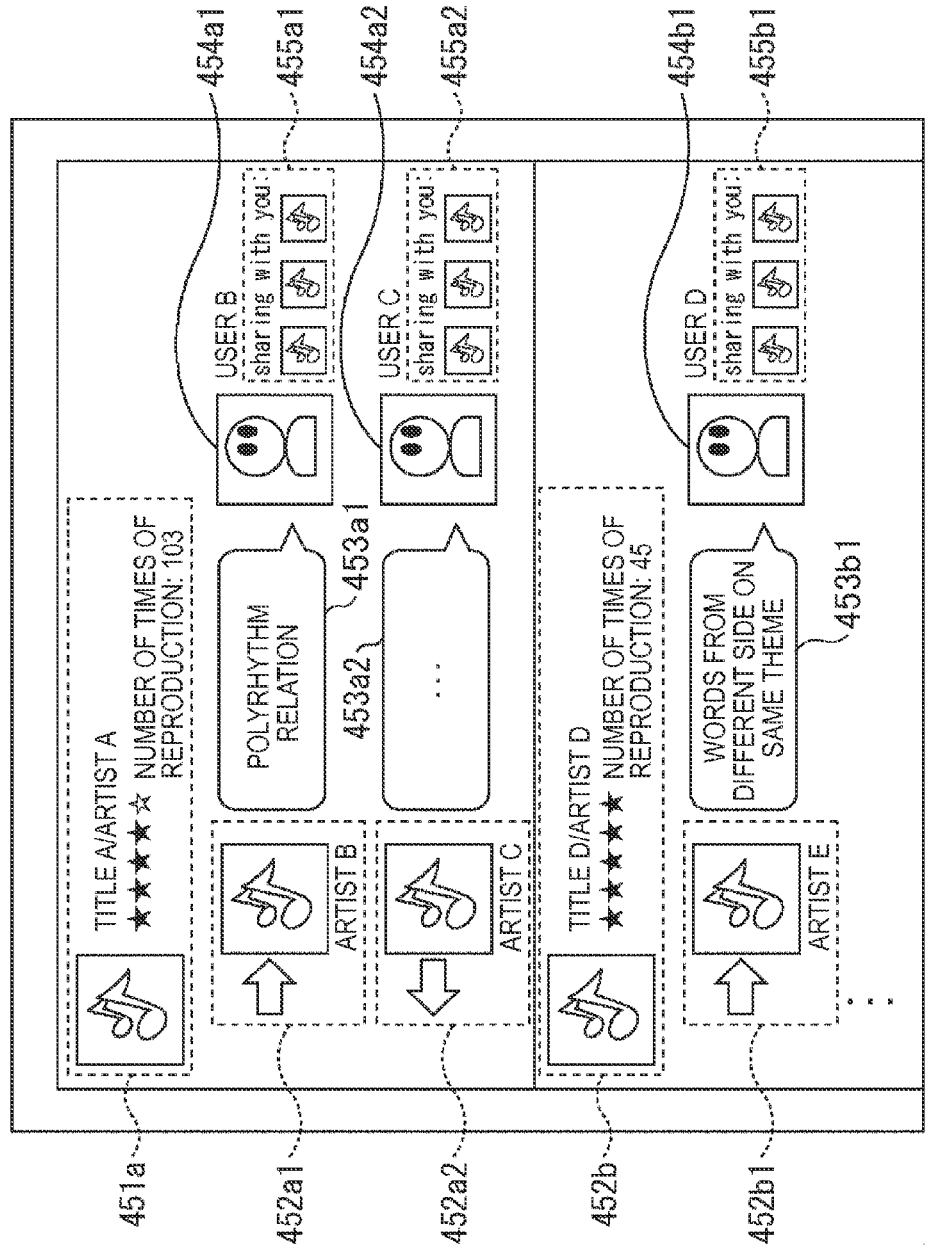
FIG. 27 is a diagram illustrating a display example of a history relation list.

FIG. 27 illustrates a display example of a history relation list. In the history relation list, a past content use history of the active user and a content link including the content included in the use history (hereinafter, referred to as history content) are displayed.

Specifically, in this example, information regarding the history content is arranged in two steps and is displayed. The display order of the history content may be arbitrarily set. For example, the history content may be arranged in order of new use dates and times or may be arranged in order of the large number of times of use (in the case of this example, the number of times of reproduction).

On the upper left side of the first step, a history content display region 451a is provided. In the history content display region 451a, information regarding one of the history content is displayed. Specifically, an image showing the history content and a title, an artist name, an evaluation value, and the number of times of reproduction of the history content are displayed. An evaluation value given by the active user may be displayed as the evaluation value and an average of the evaluation values given by the individual users may be displayed as the evaluation value. The number of times of reproduction of the active user may be displayed as the number of times of reproduction and a sum of the number of times of reproduction of all users may be displayed as the number of times of reproduction.

Under the history content display region 451a, link content display regions 452a1 and 452a2 are provided in a vertically arranged state. In the link content display regions 452a1 and 452a2, information regarding the content forming the content link with the history content displayed in the history content display region 451a is displayed.

Specifically, in the link content display region 452a1 in which a rightward arrow is displayed, an image showing content becoming the link destination of the history content displayed in the history content display region 451a and an artist name are displayed. Thereby, a content link in which the history content in the history content display region 451a becomes the link source and the content in the link content display region 452a1 becomes the link destination is provided to the active user.

On the right side of the link content display region 452a1, a balloon 453a1 is displayed. In the balloon 453a1, information that shows a link feature amount used in the content link including the history content in the history content display region 451a and the content in the link content display region 452a1 is displayed.

On the right side of the balloon 453a1, a user image 454a1 that shows the user B who has created the content link including the history content in the history content display region 451a and the content in the link content display region 452a1 is displayed. On the right side of the user image 454a1, a name or a nickname of the user B is displayed.

On the right side of the user image 454a1 and under the name of the user B, the same provided content display region 455a 1 as the provided content display region 402 of FIG. 24 is provided. In the provided content display region 455a1, an image that shows the provided content of the user B is displayed.

Meanwhile, in the link content display region 452a2 in which a leftward arrow is displayed, an image showing content becoming the link source of the history content displayed in the history content display region 451a and an artist name are displayed. Thereby, a content link in which the content in the link content display region 452a2 becomes the link source and the history content in the history content display region 451a becomes the link destination is provided to the active user.

On the right side of the link content display region 452a2, a balloon 453a2 is displayed. In the balloon 453a2, information that shows a link feature amount used in the content link including the history content in the history content display region 451a and the content in the link content display region 452a2 is displayed.

On the right side of the balloon 453a2, a user image 454a2 that shows the user C who has created the content link including the history content in the history content display region 451a and the content in the link content display region 452a2 is displayed. On the right side of the user image 454a2, a name or a nickname of the user C is displayed.

On the right side of the user image 454a2 and under the name of the user C, the same provided content display region 455a2 as the provided content display region 402 of FIG. 24 is provided. In the provided content display region 455a2, an image that shows the provided content of the user C is displayed.

In a second step, information regarding different history content of the active user, a content link including the history content, and information regarding a user who has created the content link are displayed by the same configuration as the first step.

The content link that is provided together with the history content may be limited to the content link created by the followee of the active user and may include the content link created by the recommended user.

For example, one or more screens of FIGS. 24 to 27 are combined and are displayed in the client 12 of the active user.

Then, the content link sharing processing ends.

In this way, the active user can use the content links that are created by other users. As a result, the active user can find content related to each other, on the basis of the visual points of other users. In particular, in the history relation list, the active user can find the content related to the content used by the active user. The active user can easily widen the judgment about the content and easily find the content suitable for the taste of the active user, through the content links created by other users.

Because the user who is likely to cause a change for the behavior of the active user is recommended, the active user is likely to accept the user and accept new content. Even though a user (for example, a user having the same content use history) similar to the active user is recommended, there is little new discovery for the active user. Meanwhile, if the user who is likely to cause a change for the behavior of the active user is recommended, the active user is likely to make anew discovery (for example, the active user receives the content of a new genre).

In the use history (that is, provided content) of the content provided together with the provided user, because content not similar to each other is provided, the taste of the provided user can be correctly conveyed without bias. Thereby, the active user easily knows the taste of each provided user and easily recognizes a similarity and a difference with each provided user. As a result, the active user feels the similarity with other users and easily finds the user suitable for the taste of the active user. The active user can obtain an opportunity to receive various content.

Because overlapping of the content provided between the provided users is suppressed, a similarity and a difference of the tastes between the provided users can be clearly conveyed. The active user can obtain an opportunity to receive various content.

<2. Modification>

A modification of the embodiment of the present disclosure will be described.

[First Modification: Modification Relating to Content Link]

The example of the case in which the created content link is shared between the users has been described. However, the present disclosure can be applied to the case in which a user creates a content link in a local environment and uses the content link individually.

The present disclosure can be applied to the case in which a content link in which parts of content (for example, an introduction portion of a musical composition or a portion of a bridge) are linked or a content link in which entire content and a part of another content are linked is created. When a link between parts of content is created, a content link in which different portions in the same content are linked can be created.

The example of the case in which the content link and the information of the user who has created the content link are provided has been described. However, the information of the user who has created the content link may be omitted.

The present disclosure can be applied to the case in which a content link including a one-to-one combination, a content link including a one-to-multi combination or a multi-to-one combination, and a content link including a multi-to-multi combination, are created.

The present disclosure can be applied to the case in which a content link of three connections or more is created.

The present disclosure can be applied to the case in which links of various letter, sound, and image content such as books, games, software, websites, news, and advertisements in addition to the music and the moving image described above are created.

The present disclosure can be applied to the case in which links of various items other than the content, for example, various commodities, users on a social service, and prominent people are created.

[Second Modification: Modification Relating to Provision of User and Content]

The example of the case in which the plurality of provided users are provided has been described. However, the present disclosure can be applied to the case in which one provided user is provided. That is, when one provided user and a plurality of provided content are provided, the above-described effect can be obtained by providing the provided content not similar to each other.

The example of the case in which the plurality of provided content are provided to each provided user has been described. However, the present disclosure can be applied to the case in which one piece of provided content is provided to each provided user. For example, when the plurality of provided users are provided and one piece of provided content is provided to each provided user, the above-described effect can be obtained by making the provided content not overlapped to each other.

The example of the case in which overlapping of the provided content between the provided users is prohibited has been described. However, overlapping of the provided content may be permitted in a predetermined range. That is, the number of provided content overlapped between the provided users may be limited in the predetermined range.

The number of overlapped and provided content among the entire provided content may be limited in the predetermined range. For example, when ten pieces of provided content is provided to all provided users, a maximum of two pieces of content may be overlapped.

Alternatively, the number of provided content of one provided user that overlaps the provided content of other provided users may be limited in the predetermined range. For example, when three pieces of provided content are provided to one provided user, one piece of provided content may be overlapped between one provided user and other provided users.

Alternatively, the number of provided users to which one piece of provided content is provided to be overlapped may be limited. For example, one piece of provided content may be provided to two provided users to be overlapped.

The example of the case in which the content link created by the provided user, and the provided content are provided together with the provided user has been described. However, either the content link or the provided content may be provided. That is, only the content link may be provided together with the provided user or only the provided content may be provided together with the provided user.

The present disclosure can be applied to the case in which various letter, sound, and image content such as books, games, software, websites, news, and advertisements in addition to the music and the moving image in addition to the music and the moving image described above are provided together with the provided users.

The present disclosure can be applied to the case in which various items other than the content, for example, various commodities and users on a social service are provided together with the provided users.

[Third Modification: Other Modification]

The definition of the use of the item in the present disclosure becomes different according to a kind of object items. For example, when the item is music, reproduction corresponds to the use of the item and when the item is a moving image, viewing corresponds to the use of the item. For example, when the item is a commodity, purchasing or reading of information corresponds to the use of the item. For example, when the item is another user, communication with another user corresponds to the use of the item.

The example of the case in which the expectation value of the change amount of the evaluation value of the user with respect to the content is used as the change amount expectation value has been described. However, an expectation value of a change amount of a parameter that shows the behavior of another user may be used as the change amount expectation value.

[Configuration Examples of Computer]

The above mentioned series of processes can be executed by hardware, or can be executed by software. In the case where the series of processes is executed by software, a program configuring this software is installed in a computer. Here, for example, a general purpose personal computer that can execute various functions is included in the computer, by installing a computer incorporated into specialized hardware and various programs.

Figure 28:
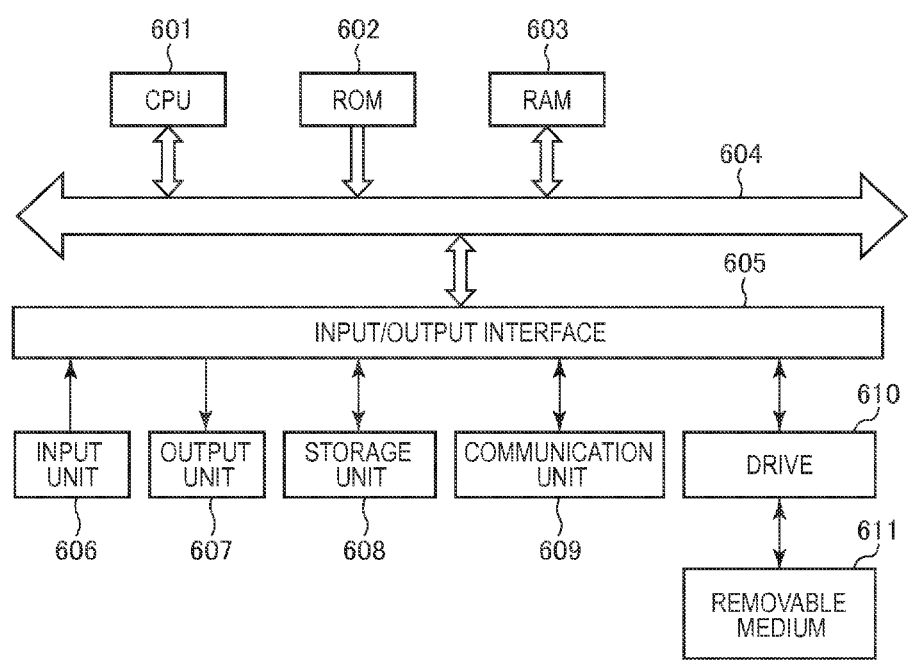
FIG. 28 is a block diagram illustrating a configuration example of a computer.

FIG. 28 is a block diagram showing a configuration example of hardware of a computer executing the above series of processes by a program.

A CPU (Central Processing Unit) 601, a ROM (Read Only Memory) 602, a RAM (Random Access memory) 603, and a bus 604 are mutually connected in the computer.

An input/output interface 605 is further connected to the bus 604. An input unit 606, an output unit 607, a storage unit 608, a communication unit 609, and a drive 610 are connected to the input/output interface 605.

The input unit 606 includes a keyboard, a mouse, a microphone or the like. The output unit 607 includes a display, a speaker or the like. The storage unit 608 includes a hard disk, a nonvolatile memory or the like. The communication unit 609 includes a network interface or the like. The drive 610 drives a removable medium 611, such as a magnetic disk, an optical disk, a magneto-optical disk, or a semiconductor memory.

In a computer configured such as above, the above mentioned series of processes are executed, for example, by the CPU 601 loading and executing a program, which is stored in the storage unit 608, in the RAM 603 through the input/output interface 605 and the bus 604.

The program executed by the computer (CPU 601) can be, for example, recorded and provided in a removable medium 611 as packaged media or the like. Further, the program can be provided through a wired or wireless transmission medium, such as a local area network, the interact, or digital satellite broadcasting.

In the computer, the program can be installed in the storage unit 608 through the input/output interface 605, by installing the removable medium 611 in the drive 610. Further, the program can be received by the communication unit 609 through the wired or wireless transmission medium, and can be installed in the storage unit 608. Additionally, the program can be installed beforehand in the ROM 602 and the storage unit 608.

Note that the program executed by the computer may be a program which performs time series processes, in accordance with the order described in the present disclosure, or may be a program which performs the processes at a necessary timing in parallel, such as when calling is performed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An information processing apparatus including:
a link feature amount selecting unit that selects a link feature amount that is a feature amount for linking a first item with another item;
an item selecting unit that selects one or more candidates of a second item to be linked with the first item, on the basis of the selected link feature amount;
a provision control unit that controls provision, to a user, of the first item, the link feature amount, and the one or more candidates of the second item; and
a link creating unit that selects the second item and creates a link of the first item and the second item.

(2) The information processing apparatus according to (1), wherein the link feature amount selecting unit selects the link feature amount, on the basis of at least one of the user and the first item.

(3) The information processing apparatus according to (2), wherein the link feature amount selecting unit calculates an important degree of a feature amount of the user, on the basis of an evaluation with respect to an item provided by the user, and selects the link feature amount on the basis of the calculated important degree.

(4) The information processing apparatus according to (2), wherein the link feature amount selecting unit calculates an important degree of a feature amount of the user, on the basis of the link feature amount used in the link of the item that is created by the user, and selects the link feature amount on the basis of the calculated important degree.

(5) The information processing apparatus according to (2), wherein the link feature amount selecting unit selects a feature amount notably showing a feature of the first item as the link feature amount.

(6) The information processing apparatus according to any one of (1) to (5),
wherein the link feature amount selecting unit selects a plurality candidates of the link feature amount, wherein the provision control unit performs control in a manner that the plurality of candidates of the link feature amount are provided to the user, and wherein the item selecting unit selects the one or more candidates of the second item, on the basis of the link feature amount selected by the user.

(7) The information processing apparatus according to any one of (1) to (6), wherein the provision control unit performs control in a manner that a plurality of candidates of the first item are provided to the user, and wherein the item selecting unit selects the one or more candidates of the second item, on the basis of the first item selected by the user and the link feature amount.

(8) The information processing apparatus according to any one of (1) to (7), wherein the link creating unit creates a link of the first item and the second item selected by the user.

(9) The information processing apparatus according to any one of (1) to (8), wherein the provision control unit controls provision, to the user, of a further created link of an item to the user.

(10) The information processing apparatus according to (9), wherein the provision control unit performs control in a manner that the link of the item is provided together with created user information.

(11) The information processing apparatus according to (9) or (10), wherein the provision control unit performs control in a manner that the link of the item is provided together with information showing the link feature amount used for creation of the link of the item.

(12) The information processing apparatus according to any one of (9) to (11), wherein, when an item use history of the user is provided, the provision control unit performs control in a manner that an item forming a link with an item included in the item use history is provided to the user.

(13) The information processing apparatus according to any one of (9) to further including:

a recommended user selecting unit that calculates, when a plurality of candidate users who are to be candidates recommended for the user are each provided, an expectation value of a change amount of behavior of the user, and selects a recommended user recommended for the user from the candidate users, on the basis of the calculated expectation value, wherein the provision control unit performs control in a manner that the link of the item that is created by the recommended user is provided to the user together with the recommended user.

(14) The information processing apparatus according to (13), wherein the recommended user selecting unit calculates the expectation value, on the basis of a probability of the user accepting the candidate user and a change amount of a prediction value of an evaluation of the user with respect to a predetermined item group by provision of feedback of the candidate user.

(15) The information processing apparatus according to (14), wherein the recommended user selecting unit calculates the expectation value, on the basis of a probability of the candidate user providing feedback to an item further included in the item group.

(16) The information processing apparatus according to any one of (1) to (15), wherein the provision control unit controls provision, to another information processing apparatus, of the first item, the link feature amount, and the one or more candidates of the second item.

(17) An information processing method including:

causing an information processing apparatus to select a link feature amount that is a feature amount for linking a first item with another item;

causing the information processing apparatus to select one or more candidates of a second item that is to be linked with the first item, on the basis of the selected link feature amount;

causing the information processing apparatus to control provision, to a user, of the first item, the link feature amount, and the one or more candidates of the second item; and causing the information processing apparatus to select the second item and create a link of the first item and the second item.

(18) A program for causing a computer to execute the processes, the processes including selecting a link feature amount that is a feature amount for linking a first item with another item, selecting one or more candidates of a second item that is to be linked with the first item, on the basis of the selected link feature amount, controlling provision, to a user, of the first item, the link feature amount, and the candidates of the second item, and selecting the second item and creating a link of the first item and the second item.

The present disclosure contains subject matter related to that disclosed in Japanese Priority Patent Application JP 2012-109337 filed in the Japan Patent Office on May 11, 2012, the entire content of which is hereby incorporated by reference.

What is claimed is:

1. An information processing apparatus for searching media items and creating at least one link, the apparatus comprising:

at least one hardware processor;

a link feature amount selecting unit that selects a link feature amount indicating a feature amount for linking two items, wherein the items include a first item as a link source content and a second item as a link destination content;

an item selecting unit that selects, on the basis of the selected link feature amount and the first item, one or more candidates, wherein the second item is selected from among the one or more candidates and is to be linked with the first item, and the selection of the one or more candidates is updated according to a change of the selected link feature amount or a change of the first item;

a provision control unit that controls a providing, to a user, of the first item, the link feature amount, and the one or more candidates from which the second item is selected, wherein the first item, the link feature amount, and the one or more candidates are provided concurrently in time upon a single display screen; and a link creating unit that selects, based on a user initiation, the second item, and creates a link that includes a combination of the first item, the link feature amount, and the second item.

2. The information processing apparatus according to claim 1, wherein the link feature amount selecting unit calculates an important degree of a feature amount related to the user, on the basis of an evaluation with respect to an item provided by the user, and selects the link feature amount on the basis of the calculated important degree.

3. The information processing apparatus according to claim 1,
wherein the link feature amount selecting unit calculates an important degree of a feature amount related to the user, on the basis of the link feature amount used in the link of the item that is created by the user, and selects the link feature amount on the basis of the calculated important degree.

4. The information processing apparatus according to claim 1,
wherein the link feature amount selecting unit selects a feature amount that shows a feature of the first item as the link feature amount.

5. The information processing apparatus according to claim 1,
wherein the link feature amount selecting unit selects a plurality of candidates from which the link feature amount is selected,
wherein the provision control unit performs control in a manner that the plurality of candidates from which the link feature amount is selected are provided to the user, and
wherein the item selecting unit selects the plurality of candidates from which the second item is selected, on the basis of the link feature amount selected by the user.

6. The information processing apparatus according to claim 1,
wherein the provision control unit performs control in a manner that a plurality of candidates from which the first item is selected are provided to the user, and
wherein the item selecting unit selects the one or more candidates from which the second item is selected, on the basis of the first item selected by the user and the link feature amount.

7. The information processing apparatus according to claim 1,
wherein the link creating unit creates a link of the first item and the second item selected by the user.

8. The information processing apparatus according to claim 1,
wherein the provision control unit controls a providing, to the user, of a further created link of an item to the user.

9. The information processing apparatus according to claim 8,
wherein the provision control unit performs control in a manner that the link of the item is provided together with created user information.

10. The information processing apparatus according to claim 8,
wherein the provision control unit performs control of the providing in a manner that the link of the item is provided together with information showing the link feature amount used for creation of the link of the item.

11. The information processing apparatus according to claim 8,
wherein, when an item use history of the user is provided, the provision control unit performs control in a manner that an item forming a link with an item included in the item use history is provided to the user.

12. The information processing apparatus according to claim 8, further comprising:
a recommended user selecting unit that calculates, when a plurality of candidate users who are to be candidates recommended for the user are each provided, an expectation value of a change amount of behavior of the user, and selects a recommended user recommended for the user from the candidate users, on the basis of the calculated expectation value,
wherein the provision control unit performs control in a manner that the link of the item that is created by the recommended user is provided to the user together with the recommended user, and
wherein the recommended user selecting unit is implemented via at least one processor.

13. The information processing apparatus according to claim 12,
wherein the recommended user selecting unit calculates the expectation value, on the basis of a probability of the user accepting the candidate user and a change amount of a prediction value of an evaluation of the user with respect to a predetermined item group by provision of feedback of the candidate user.

14. The information processing apparatus according to claim 13,
wherein the recommended user selecting unit calculates the expectation value, on the basis of a probability of the candidate user providing feedback to an item further included in the item group.

15. The information processing apparatus according to claim 1,
wherein the provision control unit controls a providing, to another information processing apparatus, of the first item, the link feature amount, and the one or more candidates from which the second item is selected.

16. An information processing method for searching media items and creating at least one link, the method comprising:
causing an information processing apparatus to select a link feature amount indicating a feature amount for linking two items, wherein the items include a first item as a link source content and a second item as a link destination content;
causing the information processing apparatus to select, on the basis of the selected link feature amount and the first item, one or more candidates, wherein the second item is selected from among the one or more candidates and is to be linked with the first item, and the selection of the one or more candidates is updated according to a change of the selected link feature amount or a change of the first item;
causing the information processing apparatus to control a providing, to a user, of the first item, the link feature amount, and the one or more candidates from which the second item is selected, wherein the first item, the link feature amount, and the one or more candidates are provided concurrently in time upon a single display screen; and
causing the information processing apparatus to select, based on a user initiation, the second item, and create a link that includes a combination of the first item, the link feature amount, and the second item.

17. A non-transitory computer-readable medium having embodied thereon a program, which when executed by a computer causes the computer to execute a method for searching media items and creating at least one link, the method comprising:
selecting a link feature amount indicating a feature amount for linking two items, wherein the items include a first item as a link source content and a second item as a link destination content;
selecting, on the basis of the selected link feature amount and the first item, one or more candidates, wherein the second item is selected from among the one or more candidates and is to be linked with the first item, and the selection of the one or more candidates is updated according to a change of the selected link feature amount or a change of the first item;

controlling a providing, to a user, of the first item, the link feature amount, and the one or more candidates from which the second item is selected, wherein the first item, the link feature amount, and the one or more candidates are provided concurrently in time upon a single display screen; and selecting, based on a user initiation, the second item, and creating a link that includes a combination of the first item, the link feature amount, and the second item.

18. The information processing apparatus according to claim 1,
wherein the link source content, the link destination content, and the link feature amount are all determined on the basis of command from the user.

19. The information processing apparatus according to claim 1,
wherein a similarity between the link source content and the link destination content is determined based on the selected link feature amount.

* * * * *